United States Patent
Cai et al.

(10) Patent No.: US 12,099,975 B1
(45) Date of Patent: Sep. 24, 2024

(54) SYSTEM FOR ANALYZING LEARNERS

(71) Applicant: AstrumU, Inc., Kirkland, WA (US)

(72) Inventors: Xiao Cai, Redmond, WA (US); Ujash Suresh Patel, Renton, WA (US); Fedir Skitsko, Renton, WA (US)

(73) Assignee: AstrumU, Inc., Kirkland, WA (US)

( * ) Notice: Subject to any disclaimer, the term of this patent is extended or adjusted under 35 U.S.C. 154(b) by 0 days.

(21) Appl. No.: 18/486,498

(22) Filed: Oct. 13, 2023

(51) Int. Cl.
G06Q 10/00 (2023.01)
G06F 40/289 (2020.01)
G06F 40/40 (2020.01)
G06Q 10/1053 (2023.01)
G06Q 50/20 (2012.01)

(52) U.S. Cl.
CPC ....... G06Q 10/1053 (2013.01); G06F 40/289 (2020.01); G06F 40/40 (2020.01); G06Q 50/2057 (2013.01)

(58) Field of Classification Search
CPC ............ G06Q 10/1053; G06Q 50/2057; G06F 40/289; G06F 40/40
See application file for complete search history.

(56) References Cited

U.S. PATENT DOCUMENTS

| | | | |
|---|---|---|---|
| 6,067,535 A | 5/2000 | Hobson et al. | |
| 6,199,062 B1 | 3/2001 | Byrne et al. | |
| 8,090,725 B1 | 1/2012 | Cranfill | |
| 8,103,679 B1 | 1/2012 | Cranfill et al. | |
| 8,375,026 B1 | 2/2013 | Elliott et al. | |
| 8,688,694 B2 | 4/2014 | Dexter | |
| 8,943,062 B2 | 1/2015 | Baumgartner et al. | |
| 9,529,863 B1 | 12/2016 | Gindin et al. | |
| 9,535,963 B1 | 1/2017 | Shankar et al. | |
| 9,849,388 B2 | 12/2017 | Cohen et al. | |
| 10,230,701 B2 | 3/2019 | Ullrich et al. | |

(Continued)

FOREIGN PATENT DOCUMENTS

| | | |
|---|---|---|
| WO | 03/054727 A1 | 7/2003 |
| WO | 2020/003325 A1 | 1/2020 |

OTHER PUBLICATIONS

The big jobs debate: who's at risk from GenAI? Mint [New Delhi] Aug. 13, 2023 (Year: 2023).*

(Continued)

*Primary Examiner* — Gabrielle A McCormick
(74) *Attorney, Agent, or Firm* — John W. Branch; Branch Partners PLLC

(57) ABSTRACT

Embodiments are directed to managing skill proficiencies. Declared skills may be determined based on a job description and natural language processing (NLP) actions declared in one or more extraction models. An inference prompt for a large language model (LLM) may be generated based on the job description such that the job description and the declared skills may be included in the inference prompt. The LLM may be trained with the inference prompt to generate a response such that the inference prompt may be iteratively updated based on validations of the response. The LLM may be retrained with the updated inference prompt to generate an updated response that includes the inferred skills that may be separate from the declared skills. A job profile that corresponds to the job description may be updated to include the declared skills and the separate inferred skills.

24 Claims, 15 Drawing Sheets

(56) References Cited

U.S. PATENT DOCUMENTS

| | | | |
|---|---|---|---|
| 10,610,792 B2 | 4/2020 | Adekunle et al. | |
| 10,789,755 B2 | 9/2020 | Amer et al. | |
| 11,074,476 B2 | 7/2021 | Wray et al. | |
| 11,074,509 B1 | 7/2021 | Wray et al. | |
| 11,151,673 B1 | 10/2021 | Wray et al. | |
| 11,227,240 B2 | 1/2022 | Cohen et al. | |
| 11,250,721 B2 | 2/2022 | Angel et al. | |
| 11,429,893 B1 | 8/2022 | Tong | |
| 11,494,863 B2 | 11/2022 | Wray et al. | |
| 11,580,323 B2 | 2/2023 | Wray et al. | |
| 11,847,172 B2 | 12/2023 | Pedersen et al. | |
| 11,861,321 B1 * | 1/2024 | O'Kelly | G06F 40/289 |
| 2002/0055870 A1 | 5/2002 | Thomas | |
| 2002/0059228 A1 | 5/2002 | Mccall et al. | |
| 2004/0236598 A1 | 11/2004 | Thomsen | |
| 2005/0080656 A1 | 4/2005 | Crow et al. | |
| 2005/0239032 A1 | 10/2005 | Hartenberger | |
| 2006/0229896 A1 | 10/2006 | Rosen et al. | |
| 2006/0265436 A1 | 11/2006 | Edmond et al. | |
| 2006/0271421 A1 | 11/2006 | Steneker et al. | |
| 2007/0082324 A1 | 4/2007 | Johnson et al. | |
| 2007/0106811 A1 | 5/2007 | Ryman | |
| 2008/0155588 A1 | 6/2008 | Roberts et al. | |
| 2008/0254423 A1 | 10/2008 | Cohen | |
| 2010/0057659 A1 | 3/2010 | Phelon et al. | |
| 2010/0125475 A1 | 5/2010 | Twyman | |
| 2010/0145729 A1 | 6/2010 | Katz | |
| 2011/0177483 A1 | 7/2011 | Needham et al. | |
| 2011/0238591 A1 | 9/2011 | Kerr et al. | |
| 2012/0022906 A1 | 1/2012 | Snyder et al. | |
| 2012/0208166 A1 | 8/2012 | Ernst et al. | |
| 2013/0275446 A1 | 10/2013 | Jain et al. | |
| 2013/0281798 A1 | 10/2013 | Rau et al. | |
| 2013/0291098 A1 | 10/2013 | Chung et al. | |
| 2013/0317377 A1 * | 11/2013 | Gupta | A61B 5/0024 |
| | | | 600/515 |
| 2014/0025427 A1 | 1/2014 | Bastian et al. | |
| 2014/0089219 A1 | 3/2014 | Mathews | |
| 2014/0172732 A1 | 6/2014 | Baladi | |
| 2014/0272889 A1 | 9/2014 | Kulkarni et al. | |
| 2014/0279632 A1 | 9/2014 | Andersen et al. | |
| 2015/0088793 A1 | 3/2015 | Burgess et al. | |
| 2015/0140526 A1 | 5/2015 | Marino et al. | |
| 2015/0242979 A1 | 8/2015 | Abts | |
| 2015/0310393 A1 | 10/2015 | Bhaskaran et al. | |
| 2015/0317754 A1 | 11/2015 | Goel et al. | |
| 2015/0347917 A1 | 12/2015 | Hua et al. | |
| 2015/0379454 A1 | 12/2015 | Polli et al. | |
| 2016/0217701 A1 | 7/2016 | Brown et al. | |
| 2016/0293036 A1 | 10/2016 | Niemi et al. | |
| 2016/0352760 A1 | 12/2016 | Mrkos et al. | |
| 2016/0379170 A1 | 12/2016 | Pande | |
| 2017/0024701 A1 | 1/2017 | Tang et al. | |
| 2017/0061817 A1 | 3/2017 | Mettler May | |
| 2017/0076244 A1 | 3/2017 | Bastide et al. | |
| 2017/0109448 A1 | 4/2017 | Adamy et al. | |
| 2017/0213179 A1 | 7/2017 | Schissel et al. | |
| 2017/0213190 A1 | 7/2017 | Hazan | |
| 2017/0243163 A1 | 8/2017 | Vootkur | |
| 2017/0293841 A1 | 10/2017 | Mcallister et al. | |
| 2017/0323211 A1 | 11/2017 | Bencke et al. | |
| 2017/0323233 A1 | 11/2017 | Bencke et al. | |
| 2018/0039946 A1 | 2/2018 | Bolte et al. | |
| 2018/0046623 A1 | 2/2018 | Faith et al. | |
| 2018/0144253 A1 | 5/2018 | Merhav et al. | |
| 2018/0157995 A1 | 6/2018 | O'Malley | |
| 2018/0225593 A1 | 8/2018 | Cozine et al. | |
| 2018/0247549 A1 | 8/2018 | Martin et al. | |
| 2018/0293327 A1 | 10/2018 | Miller et al. | |
| 2018/0300755 A1 | 10/2018 | Rohilla et al. | |
| 2019/0009133 A1 | 1/2019 | Mettler May | |
| 2019/0102700 A1 | 4/2019 | Babu et al. | |
| 2019/0108217 A1 | 4/2019 | Chen | |
| 2019/0122161 A1 | 4/2019 | Cicio, Jr. | |
| 2019/0151758 A1 | 5/2019 | Anglin et al. | |
| 2019/0180098 A1 | 6/2019 | Carpenter et al. | |
| 2019/0251477 A1 | 8/2019 | Crosta et al. | |
| 2019/0279159 A1 | 9/2019 | Cleaver et al. | |
| 2019/0378050 A1 | 12/2019 | Edkin et al. | |
| 2020/0051460 A1 | 2/2020 | Bedor et al. | |
| 2020/0125928 A1 | 4/2020 | Doyle | |
| 2020/0211041 A1 | 7/2020 | Raudies et al. | |
| 2020/0302296 A1 | 9/2020 | Miller | |
| 2020/0394592 A1 | 12/2020 | Shi et al. | |
| 2021/0158074 A1 | 5/2021 | Wray et al. | |
| 2021/0256310 A1 | 8/2021 | Roberts et al. | |
| 2021/0279668 A1 | 9/2021 | Mikhajlov | |
| 2021/0334921 A1 | 10/2021 | Austin et al. | |
| 2021/0350167 A1 | 11/2021 | Wray et al. | |
| 2022/0028020 A1 | 1/2022 | Wray et al. | |
| 2022/0138600 A1 | 5/2022 | Wray et al. | |
| 2022/0156866 A1 | 5/2022 | Dua et al. | |
| 2022/0245487 A1 | 8/2022 | Shen et al. | |
| 2022/0375015 A1 | 11/2022 | Botteril et al. | |
| 2022/0391725 A1 | 12/2022 | Wray et al. | |
| 2023/0039710 A1 | 2/2023 | Moore et al. | |
| 2023/0245030 A1 | 8/2023 | Cai et al. | |
| 2023/0259705 A1 * | 8/2023 | Tunstall-Pedoe | G06N 5/01 |
| | | | 704/9 |
| 2023/0297908 A1 * | 9/2023 | Jagadeesan | G06Q 10/06 |
| | | | 705/7.14 |
| 2023/0350952 A1 | 11/2023 | Pedersen et al. | |

OTHER PUBLICATIONS

"More than 80 New Products to Show at Next Week's HR Technology Conference & Exposition" NoticiasFinancieras, Miami, Oct. 4, 2017, pp. 1-7.

Alshanqiti et al., "Predicting Student Performance and Its Influential Factors Using Hybrid Regression and Multi-Label Classification," IEEE Access, Nov. 2020, vol. 8, pp. 203827-203844.

Dillenberger et al., "Blockchain Analytics and Artificial Intelligence," IBM Journal of Research and Development, 2019, pp. 1-13.

Gonzalez et al., "Automated Exercise Progression in Simulation-Based Training," IEEE Transactions on Systems, Man, and Cybernetics, Jun. 1994, vol. 24, No. 6, pp. 863-874.

Ludwigsen, Scott, "What Is Localization, and When Do You Need It?," Feb. 21, 2018, retrieved at: https://blog.languageline.com/what-is-localization, pp. 1-5.

Patel et al., "Using Multiple Models to Understand Data," In Proceedings of the 22nd International Joint Conference on Artificial Intelligence—vol. 2 (IJCAI 2011), AAAI Press, Jul. 2011, 1723-1728.

Yanes et al., "A Machine Learning-Based Recommender System for Improving Students Learning Experiences," EEE Access, Nov. 2020, vol. 8, pp. 201218-201235.

Office Communication for U.S. Appl. No. 16/691,479 mailed Feb. 19, 2021, 26 Pages.

Office Communication for U.S. Appl. No. 16/691,479 mailed Jun. 10, 2021, 36 Pages.

Office Communication for U.S. Appl. No. 16/691,479 mailed Jun. 25, 2020, 26 Pages.

Office Communication for U.S. Appl. No. 16/691,479 mailed Mar. 2, 2020, 22 Pages.

Office Communication for U.S. Appl. No. 16/691,479 mailed Sep. 11, 2020, 6 Pages.

Office Communication for U.S. Appl. No. 16/898,177 mailed Feb. 2, 2021, 5 Pages.

Office Communication for U.S. Appl. No. 16/898,177 mailed Feb. 23, 2021, 9 Pages.

Office Communication for U.S. Appl. No. 16/898,177 mailed Jul. 22, 2020, 12 Pages.

Office Communication for U.S. Appl. No. 16/898,177 mailed Jun. 18, 2021, 11 Pages.

Office Communication for U.S. Appl. No. 16/898,177 mailed Nov. 2, 2020, 13 Pages.

Office Communication for U.S. Appl. No. 16/898,177 mailed Sep. 1, 2021, 16 Pages.

(56) References Cited

OTHER PUBLICATIONS

Office Communication for U.S. Appl. No. 17/107,760 mailed Feb. 8, 2021, 35 Pages.
Office Communication for U.S. Appl. No. 17/107,760 mailed May 20, 2021, 8 Pages.
Office Communication for U.S. Appl. No. 17/384,577 mailed Jul. 11, 2022, 31 Pages.
Office Communication for U.S. Appl. No. 17/384,577 mailed Jun. 13, 2022, 5 Pages.
Office Communication for U.S. Appl. No. 17/384,577 mailed Mar. 22, 2022, 32 Pages.
Office Communication for U.S. Appl. No. 17/384,577 mailed Nov. 25, 2022, 29 Pages.
Office Communication for U.S. Appl. No. 17/384,577 mailed Nov. 26, 2021, 31 Pages.
Office Communication for U.S. Appl. No. 17/385,054 mailed Apr. 6, 2023, 4 Pages.
Office Communication for U.S. Appl. No. 17/385,054 mailed Jan. 30, 2023, 13 Pages.
Office Communication for U.S. Appl. No. 17/385,054 mailed Jul. 20, 2023, 12 Pages.
Office Communication for U.S. Appl. No. 17/385,054 mailed Jun. 20, 2022, 5 Pages.
Office Communication for U.S. Appl. No. 17/385,054 mailed Mar. 28, 2022, 43 Pages.
Office Communication for U.S. Appl. No. 17/385,054 mailed Nov. 19, 2021, 41 Pages.
Office Communication for U.S. Appl. No. 17/385,054 mailed Oct. 18, 2022, 48 Pages.
Office Communication for U.S. Appl. No. 17/492,527 mailed Apr. 29, 2022, 12 Pages.
Office Communication for U.S. Appl. No. 17/492,527 mailed Jan. 18, 2022, 11 Pages.
Office Communication for U.S. Appl. No. 17/492,527 mailed Jul. 15, 2022, 9 Pages.
Office Communication for U.S. Appl. No. 17/587,413 mailed Apr. 7, 2022, 27 Pages.
Office Communication for U.S. Appl. No. 17/587,413 mailed Aug. 9, 2022, 31 Pages.
Office Communication for U.S. Appl. No. 17/587,413 mailed Jul. 14, 2023, 28 Pages.
Office Communication for U.S. Appl. No. 17/587,413 mailed Mar. 20, 2023, 25 Pages.
Office Communication for U.S. Appl. No. 17/587,413 mailed May 18, 2023, 5 Pages.
Office Communication for U.S. Appl. No. 17/587,413 mailed Nov. 1, 2022, 5 Pages.
Office Communication for U.S. Appl. No. 17/587,413 mailed Nov. 22, 2022, 24 Pages.
Office Communication for U.S. Appl. No. 17/732,768 mailed Feb. 13, 2023, 3 Pages.
Office Communication for U.S. Appl. No. 17/732,768 mailed Jul. 14, 2023, 52 Pages.
Office Communication for U.S. Appl. No. 17/732,768 mailed Jul. 21, 2022, 44 Pages.
Office Communication for U.S. Appl. No. 17/732,768 mailed Mar. 22, 2023, 52 Pages.
Office Communication for U.S. Appl. No. 17/732,768 mailed Nov. 30, 2022, 48 Pages.
Office Communication for U.S. Appl. No. 17/732,768 mailed Oct. 13, 2023, 9 Pages.
Office Communication for U.S. Appl. No. 17/888,920 mailed Mar. 10, 2023, 24 Pages.
Office Communication for U.S. Appl. No. 17/888,920 mailed May 16, 2023, 4 Pages.
Office Communication for U.S. Appl. No. 17/888,920 mailed Nov. 16, 2022, 22 Pages.
Office Communication for U.S. Appl. No. 17/888,920 mailed Sep. 14, 2023, 24 Pages.
Office Communication for U.S. Appl. No. 18/091,698 mailed Apr. 20, 2023, 47 Pages.
Office Communication for U.S. Appl. No. 18/091,698 mailed Aug. 31, 2023, 53 Pages.
Office Communication for U.S. Appl. No. 18/216,025 mailed Sep. 6, 2023, 14 Pages.
Office Communication for U.S. Appl. No. 17/385,054 mailed Nov. 6, 2023, 5 Pages.
Office Communication for U.S. Appl. No. 17/385,054 mailed Nov. 15, 2023, 2 Pages.
Office Communication for U.S. Appl. No. 17/587,413 mailed Nov. 14, 2023, 30 Pages.
Office Communication for U.S. Appl. No. 18/091,698 mailed Nov. 15, 2023, 5 Pages.
Office Communication for U.S. Appl. No. 17/888,920 mailed Jan. 11, 2024, 5 Pages.
Office Communication for U.S. Appl. No. 18/216,025 mailed Dec. 22, 2023, 15 Pages.

* cited by examiner

802 — I want you to act as a program admission officer to extract eligibilities requirement from the program requirement listed below.

804 —
```
Put this message in the following JSON structure
{{
"education": "..",
"citizenship":"..",
"location": "..",
"residency":"..",
"special target population":"..",
"study availability":"..",
...
}}
```

806 — An example will be: requirement: 25 years of age or older; experiencing layoff; should have a driver's license. Should have at least 3 years working experience, have received on-job training for a year, and have a SAT score of at least 1000. Personal annual income that does not exceed $50,000; English proficiency; High school diploma or GED; Authorized to work in the US; Able to invest 6 hrs./week, Have stable housing and able to access Rung's campus in South St. Louis City. Meet industry background standards.

808 —
```
response:
{{
"education": "High school diploma or GED",
"citizenship":"Authorized to work in the US",
"location": "able to access Rung's campus in South St. Louis City",
"residency":"able to access Rung's campus in South St. Louis City",
"special target population":"who is experiencing layoff",
"study availability":" Able to invest 6 hrs./week",
...
}}
```

810 — requirement: [query statement]

902: Your goal is to extract structured information from the user's input that matches the form described below. When extracting information please make sure it matches the type information exactly. Do not add any attributes that do not appear in the schema shown below.

904:
```TypeScript
skill_entity: Array<{ // Extract skills and tools related to work
  skill_name: string // Skill related to work
}>
```

906: Please output the extracted information in CSV format in Excel dialect. Please use a | as the delimiter. Do NOT add any clarifying information. Output MUST follow the schema above. Do NOT add any additional columns that do not appear in the schema.

908:
Input: """ Data mining on over 2 billion multi-species and multi-types antigen sequences. Data crawling on extracting dataset entity in papers and patents.
"""
Output: skill_name Data mining Data crawling Input: """
creating and maintaining cloud and edge portions of an IoT solution configuring and maintaining devices using cloud services maintaining and troubleshooting device configuration throughout lifecycle
"""

910:
...
Input: """
[query statement]
"""

Output:

*Fig. 9*

SYSTEM FOR ANALYZING LEARNERS

TECHNICAL FIELD

The present invention relates generally to data management, and more particularly, but not exclusively, to systems for analyzing learners.

BACKGROUND

Identifying persons that make good employees has long been a goal of organizations. And, in today's highly competitive global market, finding and keeping great employees is becoming more challenging. Conventionally, organizations may be forced to rely on narrow or limited criteria derived from anecdotal evidence, personal preferences, gut feelings, or the like, rather than evidence based analytics to determine if a person may be a good employee candidate. Often employers seek to match open positions with job seekers using a variety of ad hoc methods, including seeking candidates based on their known skills. However, finding a verifiable mechanism for determining the skills of job seekers or determining how well a candidate's skill may match the skills required for open positions ("jobs") may be difficult for a variety of reasons. For example, in some cases, organizations may provide job descriptions that include various requirements that may be described or referenced using various terms that may vary depending on industry conventions or local conventions. Likewise, learners (students) or other potential employees may provide ad-hoc employment/education histories that employ different or non-standard terminology that may deviate from conventional or standard terminology used by organizations seeking employees. Accordingly, both automated or manual screening systems may miss valid candidates or compatible/desirable positions because of mismatches in terminology or general lack of awareness of how skills from one industry may map to skills in other industries, and so on. Thus, qualified candidates may be excluded from consideration because of screening defects rather than lack of relevant skills. Thus, it is with respect to these considerations and others that the present innovations have been made.

DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a prompt template for system for analyzing learners in accordance with one or more of the various embodiments;

FIG. 9 illustrates a prompt template for system for analyzing learners in accordance with one or more of the various embodiments;

DETAILED DESCRIPTION OF VARIOUS EMBODIMENTS

Figure 1:
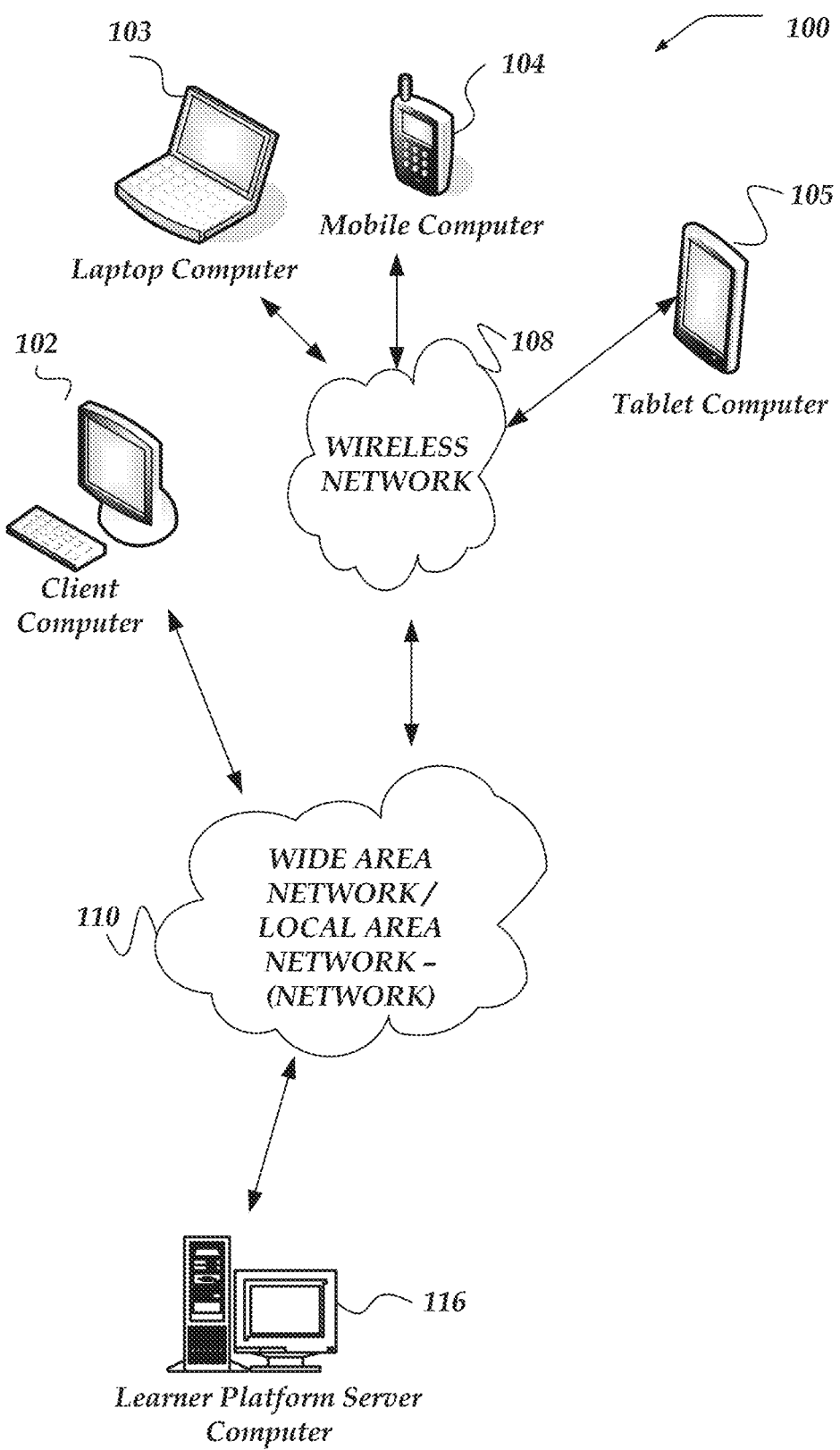
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, Java™, PHP, Perl, Python, JavaScript, Ruby, Rust, Go, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage devices and be stored on and executed by one or more general purpose computers, thus creating a special purpose computer configured to provide the engine.

As used herein the term "extraction model" refers one or more data structures that encapsulate the data, rules, machine learning models, machine learning classifiers, or instructions that may be employed to determine skill terms or activity terms that may be included in course information. Extraction models may include various components, such as, one or more machine learning based classifiers, heuristics, rules, pattern matching, conditions, or the like, that may be employed to classify terms in raw job description information. The extraction models directed to determining skills may be different from extraction models directed to determining activities.

As used herein the term "matching model" refers one or more data structures that encapsulate the data, rules, machine learning models, machine learning classifiers, or instructions that may be employed to match skill terms or activity terms that may be included in job/training information. Matching models may include various components, such as, one or more machine learning based classifiers, heuristics, rules, pattern matching, conditions, or the like, that may be employed to classify terms in raw job/training description information. Matching models may be used for matching skill terms from job descriptions with skill terms in skill libraries or other job descriptions.

As used herein the term "job" refers to a specific role or position that an individual performs in exchange for compensation or other consideration. Jobs typically involve a set of tasks, responsibilities, or duties that may contribute to the functioning of an organization, business, or industry. Jobs may vary significantly in terms of skill level, education requirements, working conditions, required skills, or remuneration.

As used herein the terms "job description," or "job information" refer to a text based narrative that describes skill requirements, education requirements, responsibilities, activities, or the like, associated with one or more jobs, employment opportunities, occupations, or the like. Note, there may be other sources of similar information such as training descriptions, course descriptions, or the like, that describe skills, activities, responsibilities, requirements, or the like, that may be associated with a particular training program or course work. In the interest of brevity or clarity, herein the term job description should be interpreted to generally represent a text description that describes one or more of features, characteristics, responsibilities, skills, activities, or the like, associated with a particular job offering, training course, military occupational specialty, certification program, or the like.

As used herein the term "skill" refers to word, phrases, sentence fragments, that describe an ability or expertise that may be performed for a job. In the case of "job descriptions" associated with training materials (rather than job offerings), the skills may be phrases sentence fragments, or the like, that a person who completed the training may be expected to be qualified to perform.

As used herein the term "job profile" refers to one or more data structures or records gathered together to provide information about a job. For example, a job profile may include (or reference) various job description information, required skills, optional skills, or the like.

As used herein the terms "job seeker," "learner," or "candidate employee" refer to a person that may have applied to job or a person that may be being considered for a job. Learners may be considered students or trainees while job seekers may be persons seeking a one or more particular jobs.

As used herein the term "learner profile" refers to one or more data structures or records gathered together to provide information about a student or job seeker. For example, a learner profile may include (or reference) various information, such as, soft skills, hard skills, verified educational history, verified employment history, short term learning/employment goals, long term learning/employment goals, demographic data, or the like. For example, interpersonal or behavioral skills (e.g., soft skills) associated with courses completed by a learner may be included in the learner's learner profile. For brevity, persons/users who are seeking jobs or otherwise under consideration for job, such as job seekers, employment candidates, students, or the like, may be referred to as learners such that their information may be collected or stored in learner profiles.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or "prompt dataset" refer to one or more data structures that contain or represent prompt information that may be provided to LLMs.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of these innovations in order to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing skill proficiencies over a network. In one or more of the various embodiments, one or more declared skills may be determined based on a job description and one or more natural language processing (NLP) actions declared in one or more extraction models.

In one or more of the various embodiments, an inference prompt for a large language model (LLM) may be generated based on the job description such that the job description and the one or more declared skills may be included in the inference prompt.

In one or more of the various embodiments, the LLM may be trained with the inference prompt to generate a response such that the inference prompt may be iteratively updated based on one or more validations of the response.

In one or more of the various embodiments, the LLM may be retrained with the updated inference prompt to generate an updated response that includes the one or more inferred skills that may be separate from the one or more declared skills.

In one or more of the various embodiments, a job profile that corresponds to the job description may be updated to include the one or more declared skills and the one or more separate inferred skills.

In one or more of the various embodiments, the job description may be determined based on job history of a learner. In some embodiments, a learner profile that corresponds to the learner may be updated to include the one or more declared skills and the one or more separate inferred skills. In some embodiments, the learner may be matched to one or more jobs based on the learner profile and one or more job profiles that may be associated with the one or more jobs.

In one or more of the various embodiments, one or more secondary LLMs may be determined based on the response. In some embodiments, one or more prompts for the one or more secondary LLMs may be generated such that the one or more prompts may include one or more portions of the response. In some embodiments, the one or more secondary LLMs may be trained with the one or more secondary prompts to generate one or more responses that include one or more other inferred skills. In some embodiments, the one or more other inferred skills may be included in the job profile.

In one or more of the various embodiments, one or more first candidate skills may be determined based on the one or more extraction models and the job description. In some embodiments, an extraction prompt may be generated for the LLM based on the job description such that the job description may be included in the extraction prompt. In some embodiments, the LLM may be trained with the extraction prompt to generate an extraction response that includes one or more second candidate skills. In some embodiments, one or more skill mismatches may be determined based on a comparison of the one or more first candidate skills to the one or more second candidate skills. In some embodiments, in response to a number of skill mismatches exceeding a threshold value, the one or more extraction models may be modified based on the one or more skill mismatches.

In one or more of the various embodiments, a learner profile that corresponds to a job seeker may be determined based on identity of the job seeker. In some embodiments, a gap analysis prompt for the LLM may be generated based on the learner profile and the job profile. In some embodiments, the LLM may be trained with the gap analysis prompt to generate a gap analysis response that declares one or more actions that enable the job seeker to qualify for a job that corresponds to the job profile such that the one or more actions may include a successful completion of one or more of a training program or an educational program.

In one or more of the various embodiments, updating the inference prompt may include: determining one or more validators based on the response from the LLM such that the one or more validators declare a data format and one or more expected values or value types; validating the response based on the one or more validators such that the one or more validators confirm that information included in the response conforms to the data format and includes the one or more expected values.

Illustrated Operating Environment

FIG. 1 shows components of one embodiment of an environment in which embodiments of these innovations may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, learner platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, learner platform computer 116, or other computers.

Client computers 102-105 may further be configured to include a client application that enables an end-user to log into an end-user account that may be managed by another computer, such as learner platform server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by learner platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, learner platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of learner platform server computer 116 is described in more detail below in conjunction with FIG. 3. Although FIG. 1 illustrates learner platform server computer 116, or the like, each as a single computer, the innovations or embodiments are not so limited. For example, one or more functions of learner platform server computer 116, or the like, may be distributed across one or more distinct network computers. Moreover, in one or more embodiments, learner platform server computer 116 may be implemented using a plurality of network computers. Further, in one or more of the various embodiments, learner platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
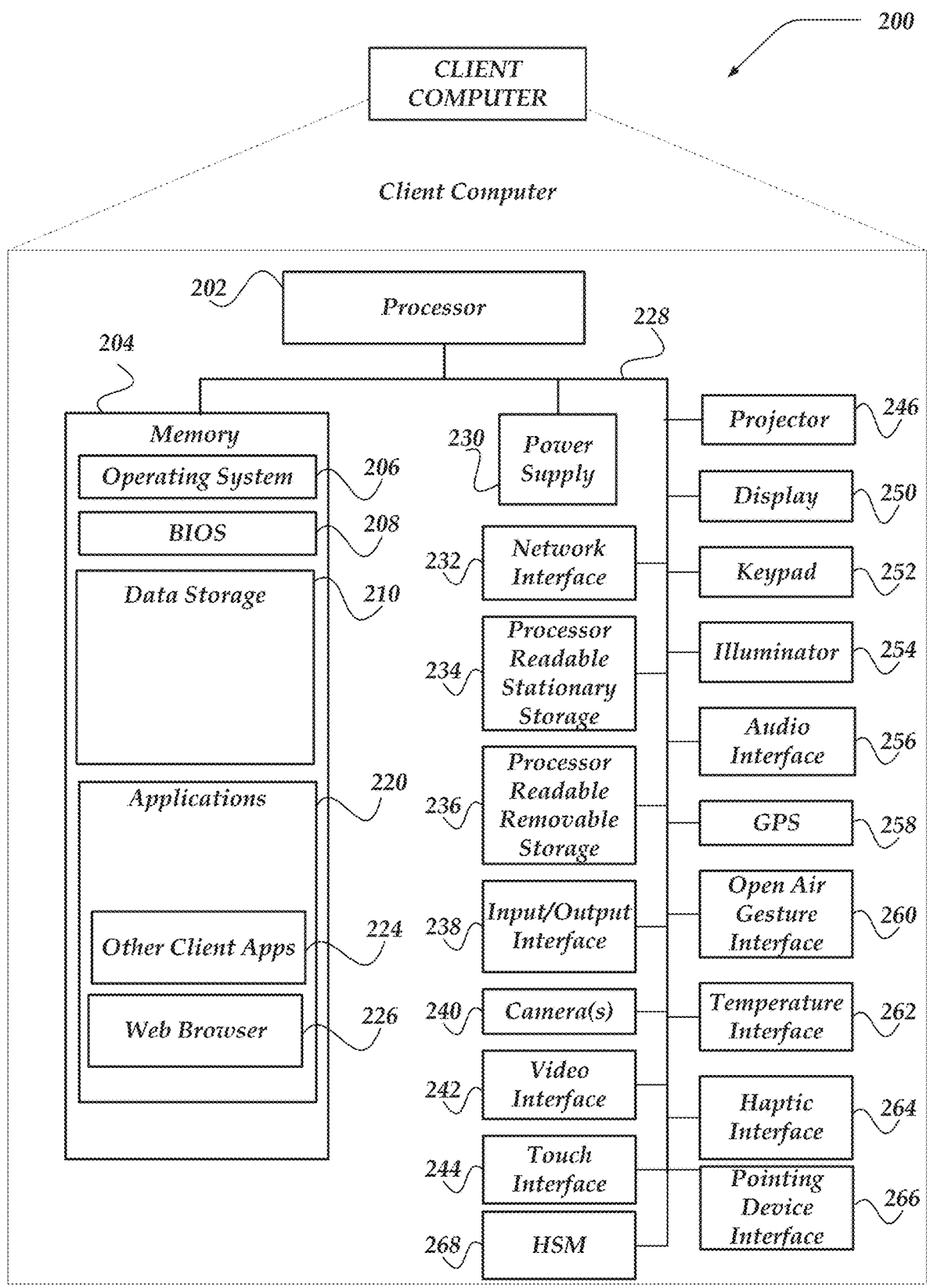
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client Apps 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
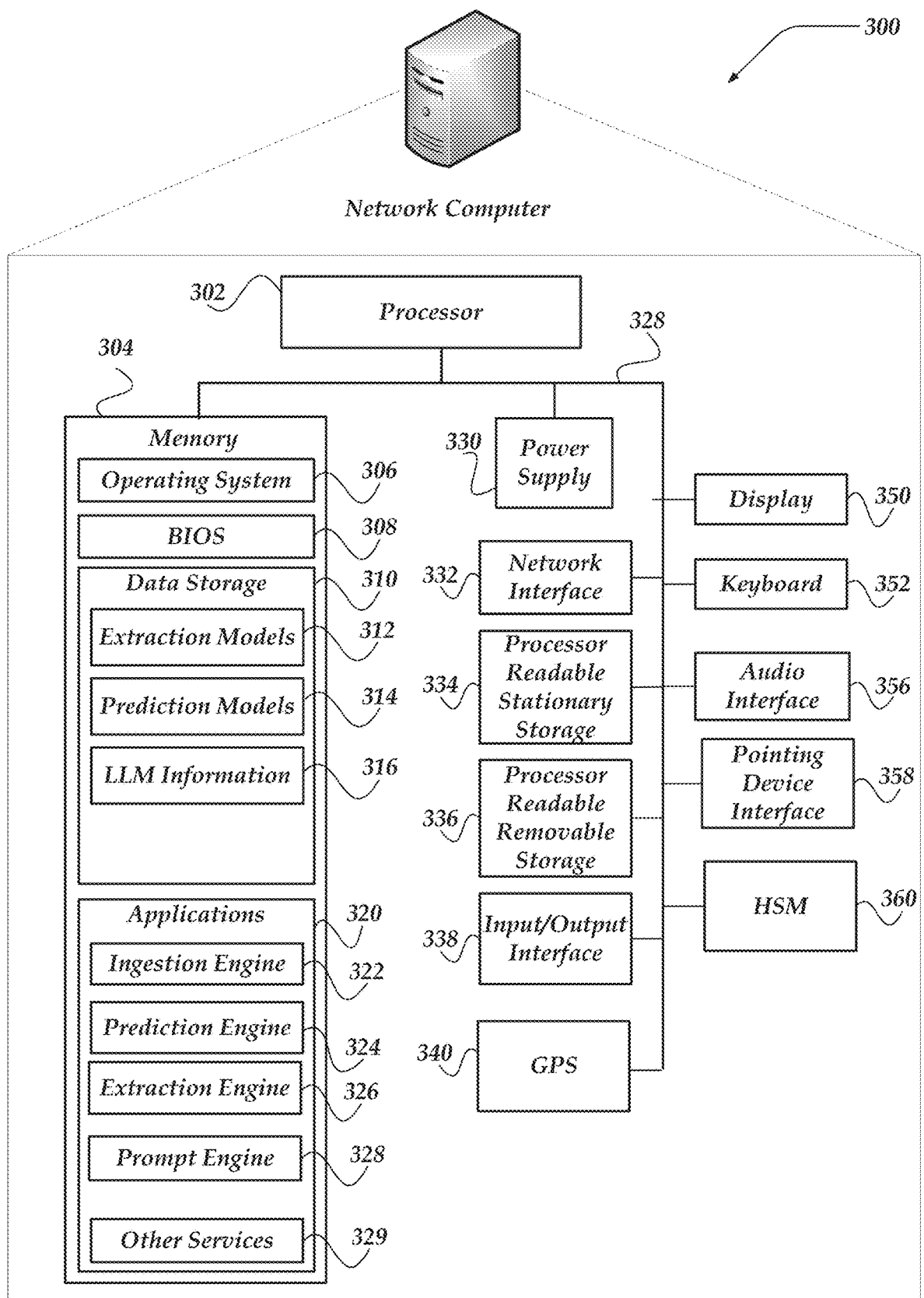
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a predictive learner server computer such as learner server computer 116, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, ingestion engine 322, prediction engine 324, extraction engine 326, prompt engine 328, other services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's MacOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, extraction models 312, prediction models 314, LLM information 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, prediction engine 324, extraction engine 326, prompt engine 328, other services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, ingestion engine 322, prediction engine 324, extraction engine 326, prompt engine 328, other services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, prediction engine 324, extraction engine 326, prompt engine 328, other services 329, or the like, may be provisioned and de-commissioned automatically.

Also, in one or more of the various embodiments, ingestion engine 322, prediction engine 324, extraction engine 326, prompt engine 328, other services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
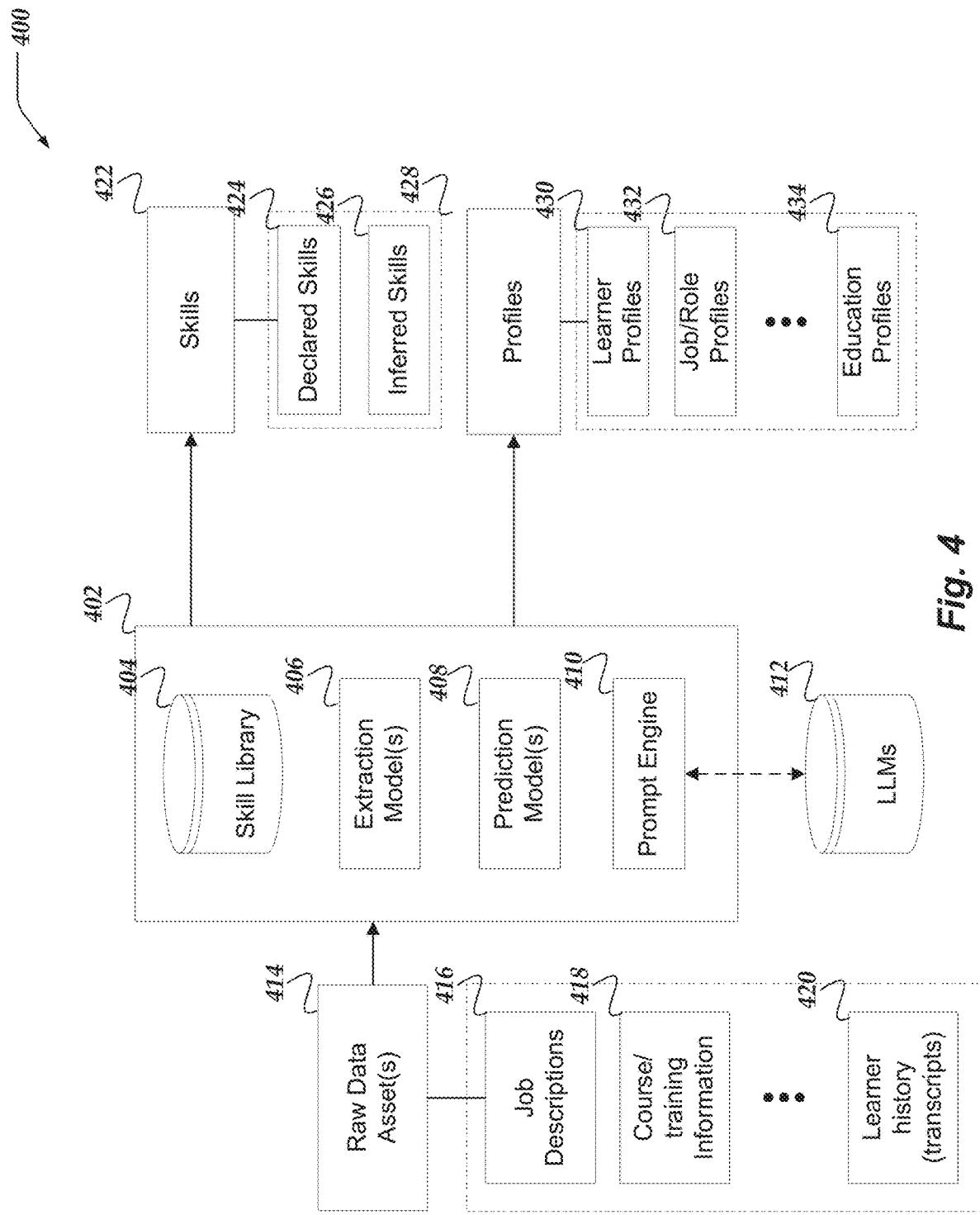
FIG. 4 illustrates a logical architecture of a system for analyzing learners in accordance with one or more of the various embodiments.

FIG. 4 illustrates a logical architecture of system 400 for analyzing learners in accordance with one or more of the various embodiments.

In one or more of the various embodiments, learner platforms may be arranged to ingest raw data from various sources, such as, job descriptions, educational materials (e.g., course descriptions, course requirements, syllabuses, student transcripts, degree programs, or the like), training documents, skill descriptions, personal resumes, government/industry career information, media reports, or the like. In this example, for some embodiments, raw data assets 414 may be considered to represent these various sources of information, including job descriptions 416, course/training information 418, learner history 420, or the like. Accordingly, in some embodiments, learner platforms such as system 400 may be arranged to employ one or more ingestion engines (not shown here) to acquire or ingest raw data from the various sources. In some embodiments, learner platforms may be arranged to employ one or more APIs or interfaces to gain access to the raw data. Also, in some embodiments, learner platforms may be arranged to obtain raw data via other mechanisms, such as, document scanning, crawling (scanning) public websites, public databases, private databases (with permission), or the like. Further, in some embodiments, learner platforms may be integrated directly or indirectly with data sources such that the "raw" data may be provided in a form or format that may be directly employed without additional transformations.

In some embodiments, learner platform servers, such as learner platform server 402 may be arranged to include one or more of skill library 404, extraction models 406, predictions models 410, prompt engines 410, or the like. In some embodiments, extraction models, such as, extraction models 406 may represent data structures that incorporate one or more heuristics, machine learning classifiers, NLP models, or the like, directed to extracting specific information from ingested data. For example, in some embodiments, one or more extraction models may be directed to identify skill information from job descriptions, learner work history, learner training/education history, or the like. Further, in some embodiments, one or more extraction models may be arranged to determine job requirements, such as, skill requirements, age requirements (e.g., for military or government positions), residency requirements, geographic requirements, or the like.

In this example, for some embodiments, skills 422 represents skills that may be determined for particular jobs or skills that may be associated with particular education, training, or work histories. In this example, for some embodiments, skills may be categorized as declared skills 424 or inferred skills 426. In some embodiments, declared skills may be considered to be skills that may be expressly listed for a particular job or training. For example, in some embodiments, job descriptions may include an explicit list of skills that may be extracted and considered to be declared skills. Also, for example, job descriptions may include narrative text that may be interpreted to infer various skills even though those skill labels/titles may not be included in the narrative text. In some embodiments, inferred skills may be determined using various methods such as comparing activity descriptions in job descriptions or training descriptions. For example, in some embodiments, learner platforms may be arranged to identify activity descriptions in job descriptions that may be correlated with specific skills. Accordingly, in some embodiments, inferred skills determined from a first job description or training description may be evaluated to determine if they may match declared skills of a second job description or training description. Also, in this example, for some embodiments, learner platforms may include a skill library, such as, skill library 404 that may provide a standard/unified collection of skills provided from official labor sources, industry standards, government publications, or the like. Thus, in some embodiments, skills determined from job descriptions, or the like, may be compared against a canonical collection of skills in the skill library.

Also, in one or more of the various embodiments, learner platforms may be arranged to generate data structures that may be referred to as profiles. In some embodiments, profiles may be data structures that group or associate various metrics or attributes for particular jobs, courses, training programs, learners (e.g., students), job applicants, or the like. For example, in some embodiments, job profiles may include the skill requirements, eligibility requirements, residency requirements, age requirements, salary ranges, or the like, for particular jobs. Likewise, for example, learner profiles may include information, such as verified skills, demographic information, career/job targets, or the like.

In this example, for some embodiments, profiles 428 represent the various profiles that may be generated or managed by learner platforms. Accordingly, in some embodiments, learner profiles 430, job profiles 432, education profiles 434, or the like, may be considered to represent some of the types (or categories) of profiles that may be generated or managed by learner platforms.

Figure 5:
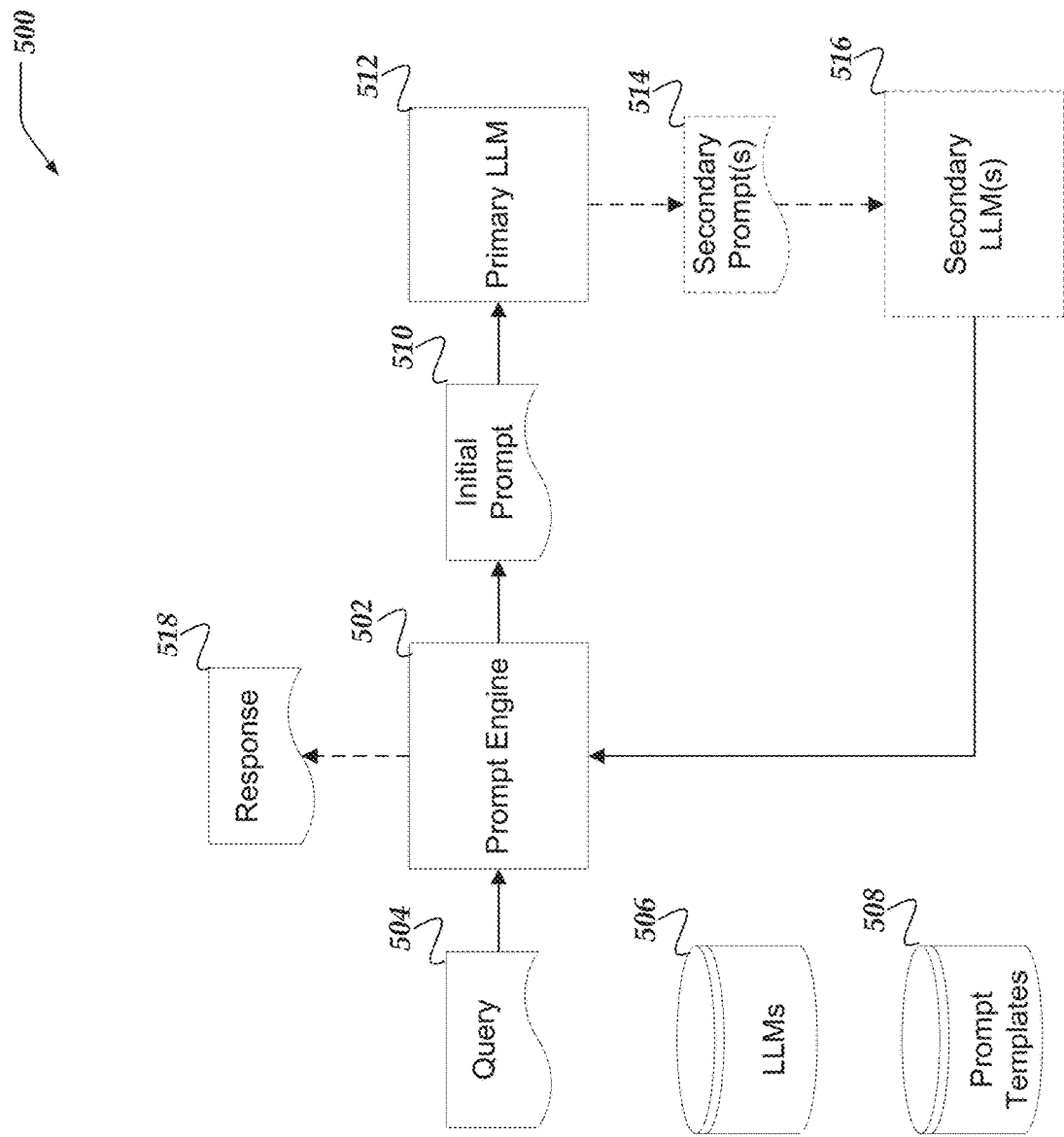
FIG. 5 illustrates a logical schematic of a system for analyzing learners in accordance with one or more of the various embodiments.

FIG. 5 illustrates a logical schematic of system 500 for analyzing learners in accordance with one or more of the various embodiments. In some embodiments, systems such as system 500 may include prompt engines, such as prompt engine 502. In some embodiments, one or more queries such as query 504 may be provided to prompt engine 502. As described, learner platforms may be arranged to provide one or more user interfaces that enable users to initial various queries using user interface controls, command line interfaces, natural language input, or the like. Accordingly, in some embodiments, query 504 may be provided to prompt engine 502.

In some embodiments, prompt engines may be arranged to interpret queries to generate prompts suitable for one or more large language models, such as LLMs 506. In some embodiments, prompt engines may be arranged to match queries with particular prompt templates that may be stored in a data store, such as prompt template data-store 508. In some embodiments, queries may include supplemental information that may be employed to select a particular prompt template. In some embodiments, prompt engines may be arranged to generate a prompt that may be provided to an LLM to enable that LLM to select a prompt template or otherwise generate an initial prompt. (See, FIG. 6.)

In one or more of the various embodiments, prompt engines may be arranged to generate an initial prompt, such as initial prompt 510 based on the initial prompt template. In some embodiments, initial prompt 510 may be provided to a primary LLM such as primary LLM 512. In some embodiments, primary LLM 512 may be considered to be an LLM that is designated for receiving and interpreting initial prompts.

In one or more of the various embodiments, primary LLMs such as primary LLM 512 may be configured to consume the initial prompt and provide a response to the query. In some embodiments, in some cases, primary LLMs may generate a response the comprises a secondary prompt here represented by secondary prompt 514. Accordingly, in some embodiments, secondary prompts such as secondary prompt 516 may be provided to one or more secondary LLMs.

In some embodiments, the secondary prompts may include meta-information (e.g., tags, labels, or the like) that may indicate which secondary LLM may be employed. Note, in some embodiments, primary LLM 512, secondary LLM 516, or the like. However, in some cases, for some embodiments, learner platforms may designate different LLMs for particular queries based on one or more characteristics or the query, the LLMs, or the like. For example, in some embodiments, LLMs may be selected based on pricing, performance, customer preferences, or the like. In some embodiments, prompt templates may include pretext/context information that may guide prompt engines in selecting LLMs. Likewise, such context information may influence how primary LLMs may generate secondary prompts or select secondary LLMs.

In some embodiments, if the initial prompt and primary LLM produce a secondary prompt, such as, secondary prompt 514 prompt engines may be arranged to determine a secondary LLM, such as secondary LLM 516 and provide the secondary prompt to the secondary LLM. Accordingly, in some embodiments, secondary LLM 516 may be employed to generate one or more responses that may be provided back to prompt engine 502. In some embodiments, prompt engines may be arranged to interpret the responses from the secondary LLMs or otherwise provide the responses to the learner platform. Accordingly, in some embodiments, learner platforms may update user interface, generate reports, or the like, based on the responses from the secondary LLMs (or primary LLMs). In some embodiments, learner platforms may provide user interfaces that enable users to approve or confirm reports or responses. Also, in some embodiments, learner platforms may be arranged to employ one or more evaluation models configured to evaluate responses using heuristics, machine-learning classifiers, NLP, or the like, to automatically approve or reject responses generated by LLMs or the prompt engine.

Figure 6:
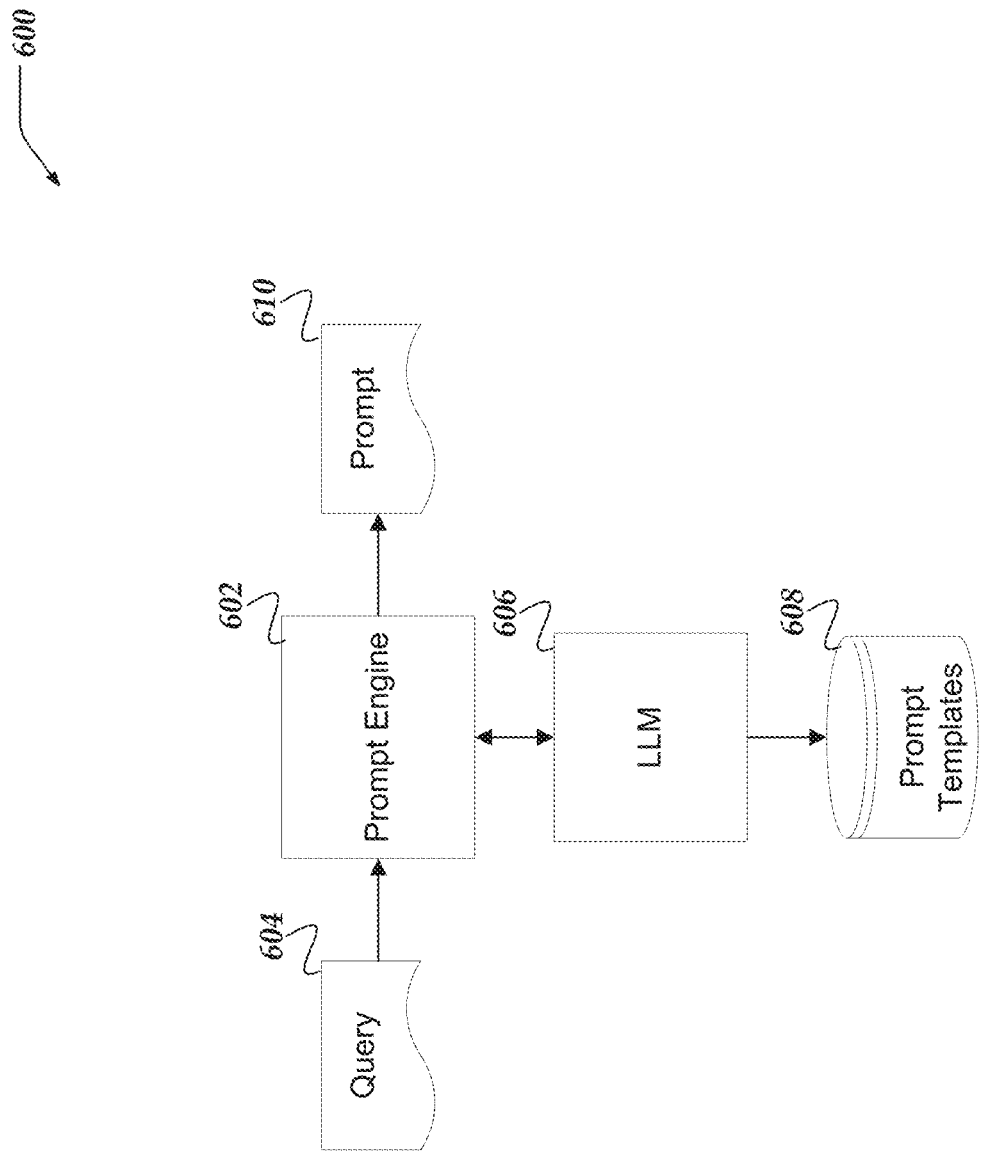
FIG. 6 illustrates a logical schematic of a system for analyzing learners in accordance with one or more of the various embodiments.

FIG. 6 illustrates a logical schematic of system 600 for analyzing learners in accordance with one or more of the various embodiments. In some embodiments, prompt engines may be arranged to generate the initial prompt based on recommendation from an LLM. Accordingly, in some embodiments, a query such as query 604 may be provided to prompt engine 602. In some embodiments, prompt engine 602 may be arranged to employ a 'standard' entry point prompt template that may be injected with incoming queries. Accordingly, in some embodiments, entry point prompts may be provided to an LLM, such as, LLM 606, for selecting a prompt template that may be appropriate for the provided queries. Alternatively, in some embodiments, prompt engines may be arranged to employ one or more rules, instructions, heuristics, machine-learning classifiers, or the like, to select the initial prompt template or generate the initial prompt. In some embodiments, learner platform may be arranged to employ one or more prompt template datastores, such as, prompt templates 608 for storing available prompt templates.

In some embodiments, prompt 610 may be considered to represent a prompt that prompt engine 602 has prepared in response to query 604. In some cases, prompt 610 may be provided to another (or the same LLM) as a query. For example, in some embodiments, query 604 may be a prompt generated based on a response from another LLM or based on a response from a previous prompt-LLM-response cycle.

Figure 7:
FIG. 7 illustrates a logical schematic of a prompt for systems for analyzing learners in accordance with one or more of the various embodiments.

FIG. 7 illustrates a logical schematic of prompt 700 for systems for analyzing learners in accordance with one or more of the various embodiments. As described above, in some embodiments, prompt engines may be arranged to determine a prompt template from among one or more prompt templates. In some embodiments, if a prompt template may be determined and a query statement is provided, prompt engines may be arranged to generate a prompt based on the prompt template and the query statement.

One of ordinary skill in the art will appreciate that the particular contents or text included in prompt templates may vary depending on various factors, including, the large language model (e.g., different types/version/brands of LLMs may require different prompt templates), format or content required for desired responses, profiles, or the like. In general prompt templates may be developed experimentally such that prompt templates produce prompts that may be used to train large language models to produce responses that conform to the requirements of learner platforms. In some embodiments, prompt templates may be included in a prompt template repository or other data store. In some cases, employing prompts to train a more generalized language model to provide particular results that the language model may not explicitly be trained or tuned for may be referred to as zero-shot learning because the generalized language model (referred to herein as large language models) is trained by the prompts in real-time to desired results. Accordingly, in some embodiments, large language models that consume prompts may perform transfer learning, or the like, to provide specific results, such as, learner profiles, job profiles, or the like.

Accordingly, in some embodiments, the particular contents of prompt templates or prompts may depend on the semantic understanding capabilities of the underlying large language model. Thus, in some cases, different large language models may require different prompt templates. Further, in some embodiments, different large language models may be engineered to address different target audiences, problem domains, or the like. Accordingly, in some embodiments, prompt engines may be arranged to select among multiple large language models depending on the queries, response targets, transaction costs, latency, or the like.

In some embodiments, prompt templates may comprise a dataset container, such as, container 702 that may hold the contents (e.g., text or audio) for the prompt. Also, in some embodiments, prompt templates may be configured to include various sections, including, for example, context section 704, guide rule section 706, example section 708, query statement placeholder 710, termination section 712, or the like. In some cases, for some embodiments, prompt templates may omit one or more sections. Likewise, in some embodiments, prompt templates may include one or more other sections. Further, in some cases, prompt templates may arrange the various sections in a different order than shown here. Thus, in some embodiments, policy engines may be arranged to employ different prompt templates for different problems or different large language models as needed.

In one or more of the various embodiments, prompt containers may be variables, parameters, objects, data structures, or the like, that enable the prompts to be passed to a large language model. In some cases, for some embodiments, a prompt container may be a buffer of text characters that form a string collection that may be included in the prompts. Likewise, for example, a prompt container may be an object or class instance designed for handling the types of content (e.g., string, audio, or the like) included in a particular prompt.

In one or more of the various embodiments, context sections such as context section 704 may be portions of a prompt template that inject statements that establish a working context that may aid in the training of the large language model to generate learner information. For example, in some embodiments, context sections may be employed to declare one or more features or characteristics of a learner profile. Accordingly, in some embodiments, large language models may incorporate this context information as part of the generative process that produces the learner information such as learner profiles.

In one or more of the various embodiments, guide rule sections such as guide rule section 706 may be portions of a prompt template that inject one or more statements that may be selected to provide additional guidance or direction for training the large language model to generate the desired responses (e.g., learner information). For example, in some embodiments, guide rules may include statements that declare rules for omitting certain types of punctuation, omitting in-depth explanation text from configuration profiles, directives to specifically or particularly take actions if certain words or text forms are encountered while generating learner profiles, or the like.

In one or more of the various embodiments, example sections such as example section 708 may be a portion of a prompt template that includes one or more examples of the learner information that may correspond to the example query statement. In some embodiments, if needed, the example information may guide the training of the large language model to generate learner information that conforms to the requirements of the learner platforms or supported organizations.

In one or more of the various embodiments, query statement placeholders such as query statement placeholder 710 may be specialized tokens, markers, mark-up, or the like, that indicate where in the prompt template that the actual query statement should be embedded in the prompt.

In one or more of the various embodiments, termination sections such as termination section 712 may be a portion of a prompt template that includes additional context information or guide rules that may be required to "close" the prompts. For example, for some embodiments, termination sections may include a text statement indicating the large language model should end the text generation session, or the like.

In some embodiments, learner platforms may be arranged to employ one or more pre-made prompt engineering frameworks that support key words, data definitions languages, formatting, or the like, that enable parameterized prompt generation such that prompt engines may be arranged to provide particular parameters or inputs that enable the prompt engineering framework to generate the actual prompts that may be provided to LLMs.

FIG. 8 illustrates prompt template 800 for system for analyzing learners in accordance with one or more of the various embodiments. As described above, prompt templates may include one or more sections. Accordingly, for some embodiments, prompt template 800 represents a prompt template that a learner platform may employ to generate a prompt that may be provided to train a large language model to generate learner information, such as learner profiles, course profiles, or the like. In this example, prompt 800 may be directed to automatically determine program requirements based on course/program information (e.g., syllabuses, course descriptions, course catalogs, or the like.)

In this example, for some embodiments, context section 802 includes text that establish a working context that may influence the reasoning used by the large language model shape or format of the data structures of the expected/requested learner information.

Also, in this example, for some embodiments, section 804 provides an example of a data structure the large language model is directed to generate in response to a prompt based on the prompt template 800.

Also, in this example, for some embodiments, section 806 includes an example of the type of input that will be provided with the prompt. In this example, section 806 includes a natural language narrative the includes the requirements for a program or course.

Also, in this example, for some embodiments section 808 includes an example of a valid response to the example input information in section 806.

Also, in this example, for some embodiments section 810 includes the placeholder marker where the actual query statements may be included. In this example, section 810 may be filled with a natural language narrative of course requirements ingested from one or more course descriptions, syllabuses, or the like.

Also, in this example, a termination section is omitted. Alternatively, in some embodiments, a termination section may be included if it is determined that including a termination section results in improved responses.

FIG. 9 illustrates prompt template 900 for system for analyzing learners in accordance with one or more of the various embodiments. As described above, prompt templates may include one or more sections. Accordingly, for some embodiments, prompt template 90 represents a prompt template that a learner platform may employ to generate a prompt that may be provided to train a large language model to generate learner information, such as learner profiles, course profiles, or the like. In this example, prompt 800 may be directed to extracting skill information for courses or programs based on course/program information (e.g., syllabuses, course descriptions, course catalogs, or the like.)

In this example, for some embodiments, context section 902 includes text that establish a working context that may influence the reasoning used by the large language model shape or format of the data structures of the expected/requested learner information.

Also, in this example, for some embodiments, section 904 provides an example of a data structure the large language model is directed to generate in response to a prompt based on the prompt template 900.

Also, in this example, for some embodiments, section 906 includes guidelines rules or guardrail rules for shaping the output of the large language model in response to a prompt based on prompt template 900.

Also, in this example, for some embodiments section 908 includes examples of inputs with valid example responses.

Also, in this example, for some embodiments section 910 includes the placeholder marker where the actual query statements may be included. In this example, section 910 may be filled with a natural language narrative that may include skill requirements ingested from one or more course descriptions, syllabuses, or the like.

Also, in this example, a termination section is omitted. Alternatively, in some embodiments, a termination section may be included if it is determined that including a termination section results in improved responses.

Generalized Operations

FIGS. 10-15 represent generalized operations for analyzing learners in accordance with one or more of the various embodiments. In one or more of the various embodiments, processes 1000, 1100, 1200, 1300, 1400, and 1500 described in conjunction with FIGS. 10-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as those in a cloud-based environment. However, embodiments are not so limited and various combinations of network computers, client computers, or the like may be utilized. Further, in one or more of the various embodiments, the processes described in conjunction with FIGS. 10-15 may perform actions for analyzing learners in accordance with at least one of the various embodiments or architectures such as those described in conjunction with FIGS. 1-9. Further, in one or more of the various embodiments, some or all of the actions performed by processes 1000, 1100, 1200, 1300, 1400, and 1500 may be executed in part by ingestion engine 322, prediction engine 324, extraction engine 326, prompt engine 328, or the like.

Figure 10:
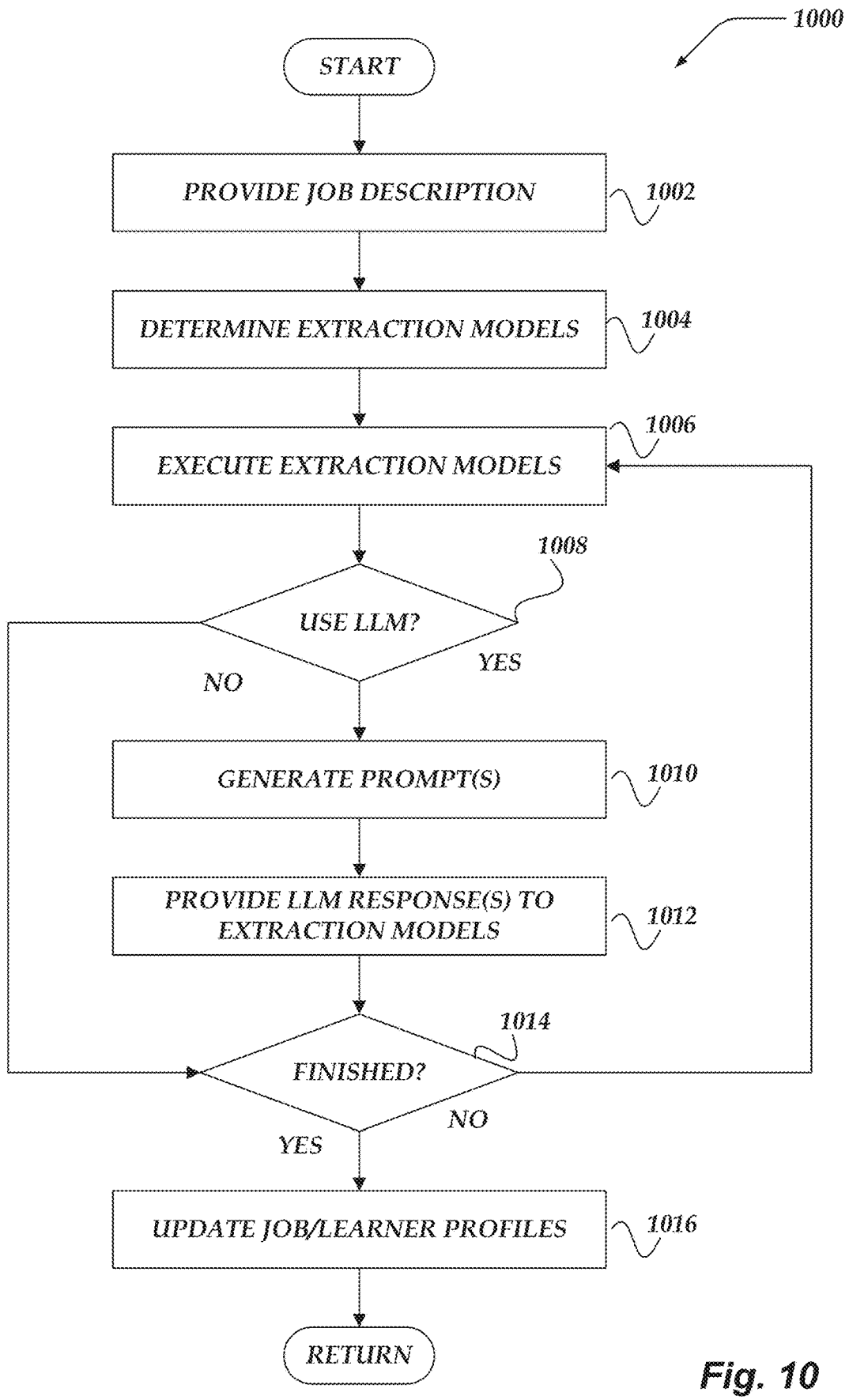
FIG. 10 illustrates an overview flowchart for a process for analyzing learners in accordance with one or more of the various embodiments.

FIG. 10 illustrates an overview flowchart for process 1000 for analyzing learners in accordance with one or more of the various embodiments. After a start block, at block 1002, in one or more of the various embodiments, job description information may be provided to analysis platform. As described above, job description information may be provided from various sources, job advertisements, job descriptions, industry journals, training materials, or the like. In some cases, for brevity job description information may be assumed to encompass corollary information such as information associated with training or education associated with one or more jobs or careers. In such cases, the job description information may be provided from course descriptions, course catalogs, syllabuses. training documents, or the like.

At block 1004, in one or more of the various embodiments, analysis engines or ingestion engines may be arranged to determine one or more extraction models. In some embodiments, extraction models may be comprised of data structures, or the like, that include the instructions, rules, NLP methods, classifiers, heuristics, or the like, that ingestion engines may employ to execute various information extraction tasks. In some embodiments, such tasks may include determining prerequisite skills, prerequisite requirements, or the like.

In one or more of the various embodiments, particular extraction models may be associated with one or more particular information sources or information types. For example, one or more extraction models may be directed to extracting skills from job decription documents provided from a particular source while other extraction models may be directed to extraction skills from the job description documents provided from different sources (or in different formats). Accordingly, in some embodiments, ingestion engines may be arranged to employ configuration information to map particular extraction models to particular information sources or formats.

Also, in some embodiments, ingestion engines may be arranged to employ multiple extraction models such that the results of different models may be compared or otherwise evaluated. For example, in some embodiments, one or more expirmental/candidate extraction models may be used alongside one or more authorized extraction models to determine if the expirmental extraction models may perform better or worse that the currently used extraction models.

At block 1006, in one or more of the various embodiments, analysis engines or extraction engines may be arranged to execute the one or more extraction models. In some embodiments, extraction models may declare one or more actions, one or more success criteria, one or more error conditions, or the like, that may be associated with the extraction of information from the provided sources.

At decision block 1008, in one or more of the various embodiments, if a large language model may be employed, control may flow to block 1010; otherwise, control may flow to decision block 1014. In some cases, extraction models may declare that a large language model may be used to interpret the job description information.

At block 1010, in one or more of the various embodiments, analysis engines or extraction engines may be arranged to generate one or more prompts for the large language model. As described above, in some embodiments, if an extraction model may be configured to employ a large language model, one or more prompts may be generated. In some embodiments, the particular prompt template for generating prompts may vary depending on the type of job description information, the source/format of the job description information, the type (or purpose) or the query statements, the desired type of response information, or the like.

At block 1012, in one or more of the various embodiments, analysis engines or extraction engines may be arranged to provide the large language model response(s) to the one or more extraction models. In some embodiments, extraction engines may provide the generated prompts to one or more large language model to obtain responses the correspond to the provided prompts.

At decision block 1014, in one or more of the various embodiments, if the extraction may be finished, control may be block 1016; otherwise, control may loop back to block 1006. In some embodiments, extraction engines may be arranged to iteratively apply one or more extraction models to the same job description information. For example, in some cases, for some embodiments, particular extraction models may be directed to extracting different types of information. Accordingly, in some embodiments, one or more of these extraction models may be executed serially or concurrently to the job description information. Thus, in some embodiments, ingestion engines may be arranged to progressively collect information based on the job description information.

At block 1016, in one or more of the various embodiments, analysis engines may be arranged to update one or more job profiles or learner profiles.

As described above, learner platforms may be arranged to manage information about learners, jobs, training programs, courses, or the like, using one or more data structures referred to herein as profiles. Accordingly, in some embodiments, information extracted from job description information, such as skill requirements, other eligibility requirements, verified learned skills, demographic requirements, verified work history, or the like, may be tracked in profiles. For example, information about a particular job seeker or learner may be collected in a learner profile. Similarly, for example, information about a particular course or training program may be stored in a course profile.

Next, in one or more of the various embodiments, control may be returned to a calling process.

Figure 11:
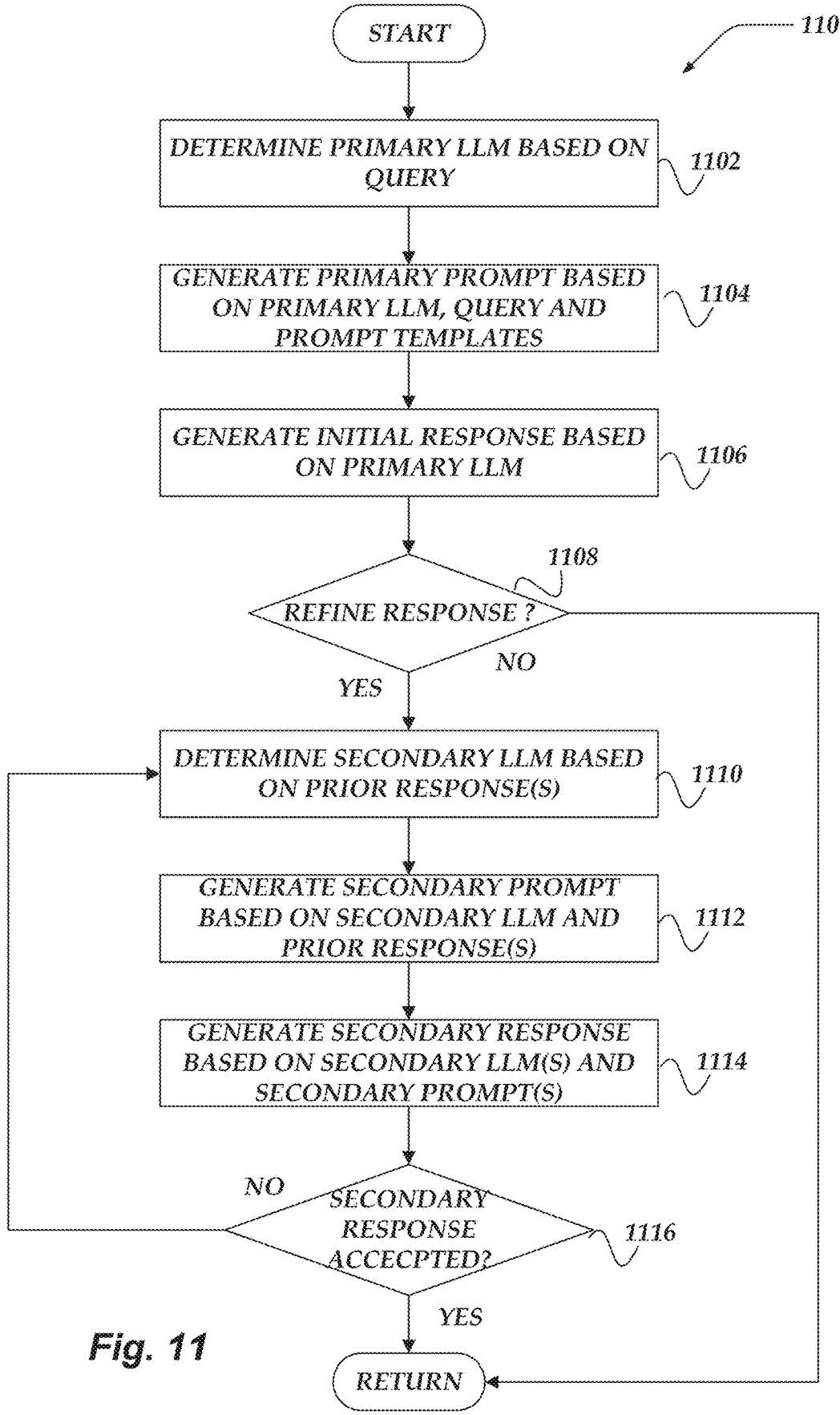
FIG. 11 illustrates a flowchart for a process for analyzing learners in accordance with one or more of the various embodiments.

FIG. 11 illustrates a flowchart for process 1100 for analyzing learners in accordance with one or more of the various embodiments. After a start block, at block 1102, in one or more of the various embodiments, analysis engines may be arranged to determine a primary large language model based on query information. As described above, in some embodiments, learner platforms may be arranged to enable users to provide query information via one or more interfaces. In some cases, in some embodiments, user interaction via the user interface may trigger the generation of one or more query statements or other query information. For example, in some embodiments, learner platforms may be arranged to provide user interfaces the maps one or more user interface controls to one or more query statements. In some cases, for some embodiments, prompt engines may be arranged to generate query information based on a query template such that one or more portion of the query information is provided by the template and another portion of the query information is provided based on user interaction.

Accordingly, in some embodiments, query information may be associated with one or more primary large language models. In some embodiments, the association of a large language model and query information may be determined based on configuration information that maps queries or query templates to particular large language models. Also, in some embodiments, the query information itself may be configured to embedded tags or other values that may reference a particular large language model. Also, in some embodiments, learner platforms or prompt engines may be arranged to employ one or more rules, regular expressions, instructions, classifiers, heuristics, or the like, that may be employed to determine a primary large language model for a given query.

At block 1104, in one or more of the various embodiments, analysis engines may be arranged to generate a primary prompt based on the primary large language model, the query information, one or more prompt templates. As described above, in some embodiments, learner platforms may be arranged to employ one or more prompt templates that include large language model specific information for generating desired responses from the primary large language model. In some embodiments, the particular contents of a prompt may vary depending on the type of query, the type of large language model, query contents, or the like. Thus, in some embodiments, the particular contents of a given prompt template may be determined by experiment and stored for subsequent use in production environments.

At block 1106, in one or more of the various embodiments, analysis engines may be arranged to generate an initial response based on the primary large language model. in one or more of the various embodiments, prompt engines may be arranged to provide the prompt that includes the query information to the primary large language model. In some embodiments, prompt engines may be arranged to employ one or more APIs or interfaces that enable the prompt to be provided to the primary large language model.

Accordingly, in some embodiments, primary large language models may generate a response based on the prompts. In some embodiments, the particular contents or organization of the response may vary depending on the corresponding prompt. In some embodiments, prompts may be configured to train large language model to generate text that may be converted into data structures that may be used by the learner platform. For example, in some embodiments, a prompt may be configured to request that the large language model provide a response that may be expressed as JSON, XML, or other machine readable formats. Also, in some embodiments, prompts may be configured to enable large language models to generate instructions, code, scripts, or the like, that may be executed by other components in the learner platform.

At decision block 1108, in one or more of the various embodiments, if the response may be refined, control may flow to block 1110; otherwise, control may be returned to a calling process.

In some cases, in some embodiments, a prompt that may seem otherwise well-formed may cause a large language model to report an error or otherwise fail to generate a response to the provided prompt. Accordingly, in some embodiments, prompt engines may be arranged to include one or more exception handlers that may be directed to processing errors associated with the large language model. For example, these may include system errors, such as, out-of-memory errors, timeouts, license issues, input errors (e.g., prompt size exceeding an enforced limit, or the like), access failures, credential failures, or the like.

Also, in some cases, in some embodiments, an error-free response may omit one or more required features or values that may otherwise be expected to be found in valid responses. For example, in some embodiments, the large language model may fail to generate a correct data structure, or it may omit one or more essential fields, values, or the like, in the response.

Accordingly, in some embodiments, prompt engines, or the like, may be arranged to perform one or more actions to validate responses. In some embodiments, prompt engines or learner platforms may be arranged to execute one or more validators to validate the contents of the response. In some embodiments, different prompts may be associated with one or more different validators. For example, a first prompt may be expected to generate a response that conforms to a first data format. Accordingly, in this example, a validator for the first prompt may be arranged to confirm that the response includes the expected data format with the expected data types, fields, values, or the like. Naturally, in some embodiments, validators may be tuned or configured depending on the particular type of validation they may be responsible for. Accordingly, in some embodiments, learner platforms or prompt engines may be arranged to determine validators based on configuration information to account for local circumstances or local requirements. For example, if a new prompt template may be introduced, one or more validators directed to validate the expected responses for the new prompt may be provided in configuration information. In some cases, the configuration information may include links or references to one or more dynamically loadable libraries, scripts, or the like, for validating a particular response.

At block 1110, in one or more of the various embodiments, analysis engines may be arranged to determine secondary large language model based on prior response(s).

Further, in some embodiments, similar to determining the primary large language model based on the query information, learner platforms may be arranged to determine one or more secondary large language models based on the response generated by the primary large language model. For example, in some embodiments, learner platforms may be arranged to select a particular secondary large language model based on one or more values included in the response from the primary large language model. Also, in some embodiments, the initial query information may include information that indicates if a secondary large language model may be employed.

For example, a first query information may be employed to generate and fill one or more data structures. In some examples, these one or more data structures may be included in a second prompt for a secondary large language model.

At block 1112, in one or more of the various embodiments, analysis engines may be arranged to generate one or more secondary prompts based on the secondary large language model and the one or more prior responses. Similar to generating the initial prompt for the primary large language model, learner platforms may be arranged to generate prompts for the secondary large language models.

At block 1114, in one or more of the various embodiments, acquisition engines may be arranged to generate one or more secondary responses based on the secondary large language models and the one or more secondary prompts. Similar as described for generating the one or more primary responses, learner platform may be arranged to generate one or more secondary responses.

At decision block 1116, in one or more of the various embodiments, if the secondary response may be accepted, control may be returned to a calling process; otherwise, control may loop back to block 1110. Similar to the validators described above, learner platforms may be arranged to validate or otherwise evaluate the secondary responses. In some cases, the secondary response may trigger further rounds of prompt generation or response generation. For example, a validator may determine that additional rounds of prompts/responses may be required otherwise the process may be ended.

Next, in one or more of the various embodiments, control may be returned to a calling process.

Figure 12:
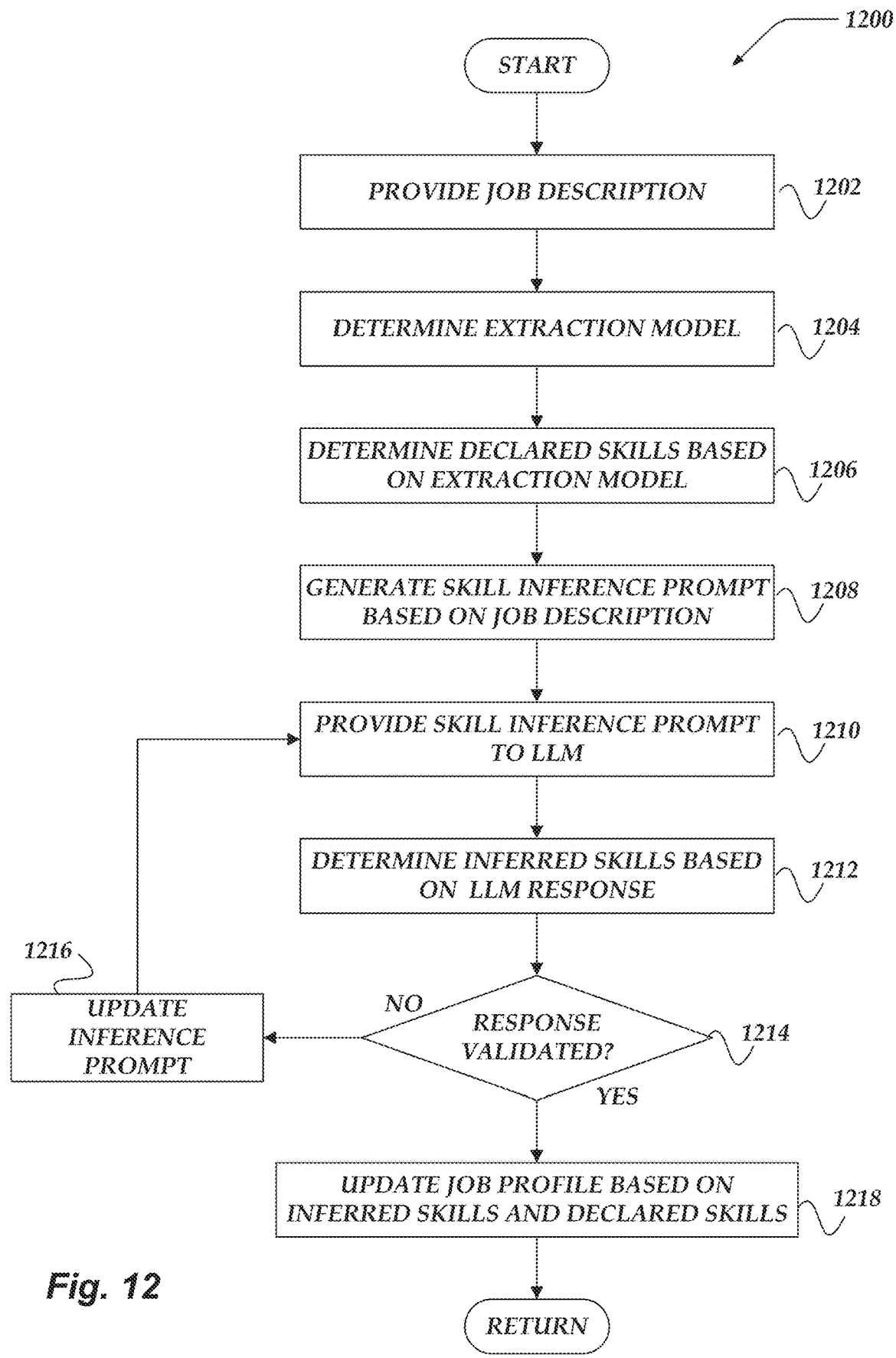
FIG. 12 illustrates a flowchart for a process for analyzing learners in accordance with one or more of the various embodiments.

FIG. 12 illustrates a flowchart for process 1200 for analyzing learners in accordance with one or more of the various embodiments. After a start block, at block 1202, in one or more of the various embodiments, job description information may be provided. As described above, job description information may be considered to be verifiable (e.g., official) information that describes the nature of the responsibilities or duties of a job. Likewise, for brevity or clarity job description information may be considered to include information about educational courses, training programs, military occupational specialties, or the like. Accordingly, in some embodiments, job description information may be expected to include information associated with one or more of learned skills, required skills, or the like.

At block 1204, in one or more of the various embodiments, extraction engines may be arranged to determine an extraction model. In some embodiments, learner platforms may be arranged to employ one or more extraction models to determine one or more declared skills from a job description. In some embodiments, extraction models may be data structures or the like that declare one or more instructions, classifiers, NLP actions, heuristics, or the like, for extracting skill information from job descriptions.

At block 1206, in one or more of the various embodiments, ingestion engines may be arranged to determine one or more declared skills based on the extraction model. In some embodiments, extraction models may be arranged to identify words or phrases in the job description that may correspond to skills. For example, if the job description includes a narrative that lists one or more "required skills", extraction models may be configured to extract those words or phrases and map them to one or more declared skills.

At block 1208, in one or more of the various embodiments, ingestion engines may be arranged to generate one or more skill inference prompts based on the job description information. In some cases, job descriptions may include narratives that may be interpreted as inferring a skill rather than the skill being expressly listed or declared.

Accordingly, in some embodiments, ingestion engines may be arranged to generate an inference prompt that includes the job description. Also, in some embodiments, ingestion engines may be arranged to include the declared skills in the inference prompt. For example, one or more of the declared skills may be included as examples of skills. In some embodiments, prompts arranged to train large language models to infer skills from job descriptions may be referred to as inference prompts.

At block 1210, in one or more of the various embodiments, ingestion engines may be arranged to provide one or more skill inference prompts to the large language model. Similar to as described above, ingestion engines may be arranged to provide the inference prompt to a large language model.

At block 1212, in one or more of the various embodiments, ingestion engines may be arranged to determine one or more inferred skills based on the large language model response to the inference prompt.

In one or more of the various embodiments, the inferred skills may be in a format determined or suggested in the inference prompt. As described above for other prompts, inference prompts may be executed to train (e.g., one-shot learning, or the like) the large language model by including examples of the expected format and expected response values.

At decision block 1214, in one or more of the various embodiments, if the response may be validated, control may flow to block 1218; otherwise, control may flow to block 1216. As described above, in some embodiments, ingestion engines may be arranged to employ one or more validators to validate responses from large language models.

At block 1216, in one or more of the various embodiments, ingestion engines may be arranged to modify the prompt based on the results of the validation to retrain the large language model. In some embodiments, one or more validators may include instructions for modifying prompts. In some cases, a validator may require a retry of the same prompt. For example, if submission of the prompt resulted in a timeout or other potentially transient error, validators may request a retry of the same prompt. In other cases, a validator may determine that context information may be added or removed from the prompt before retrying. For example, if a validator determines (via an error response) that the submitted prompt was too large, the validator may suggest removing some of the context information to reduce the size of the prompt. For example, if the large language model prompt size is exceeded the ingestion engine may modify the prompt by removing portions of the job description from the prompt. In some cases, ingestion engines may be arranged to generate a notification or report and pause the ingestion process until a user has reviewed or updated the prompt.

Also, in some embodiments, a validator may initiate the use of secondary large language models with secondary prompts to resolve invalid responses. For example, in some embodiments, a validator may trigger the use of a more expensive (or resource intensive) large language model that may be able to generate a valid response where a less expensive large language model was unable. At block 1218, in one or more of the various embodiments, ingestion engines may be arranged to update one or more job profiles based on inferred skills and declared skills. In some embodiments, job profiles may be data structures for storing the list of skills determined based on the job description. For example, a job profile associated with the job description may include lists of declared skills or inferred skills. These skills may be interpreted as skill requirements for prospective employees. Also, in some embodiments, these skills may be interpreted as skill a person who is verified performing the job in the past may be expected to have. Or, if the job description is associated with training or education programs, the determined skills may be expected of those that may be verified as having completed those training or education programs.

Next, in one or more of the various embodiments, control may be returned to a calling process.

Figure 13:
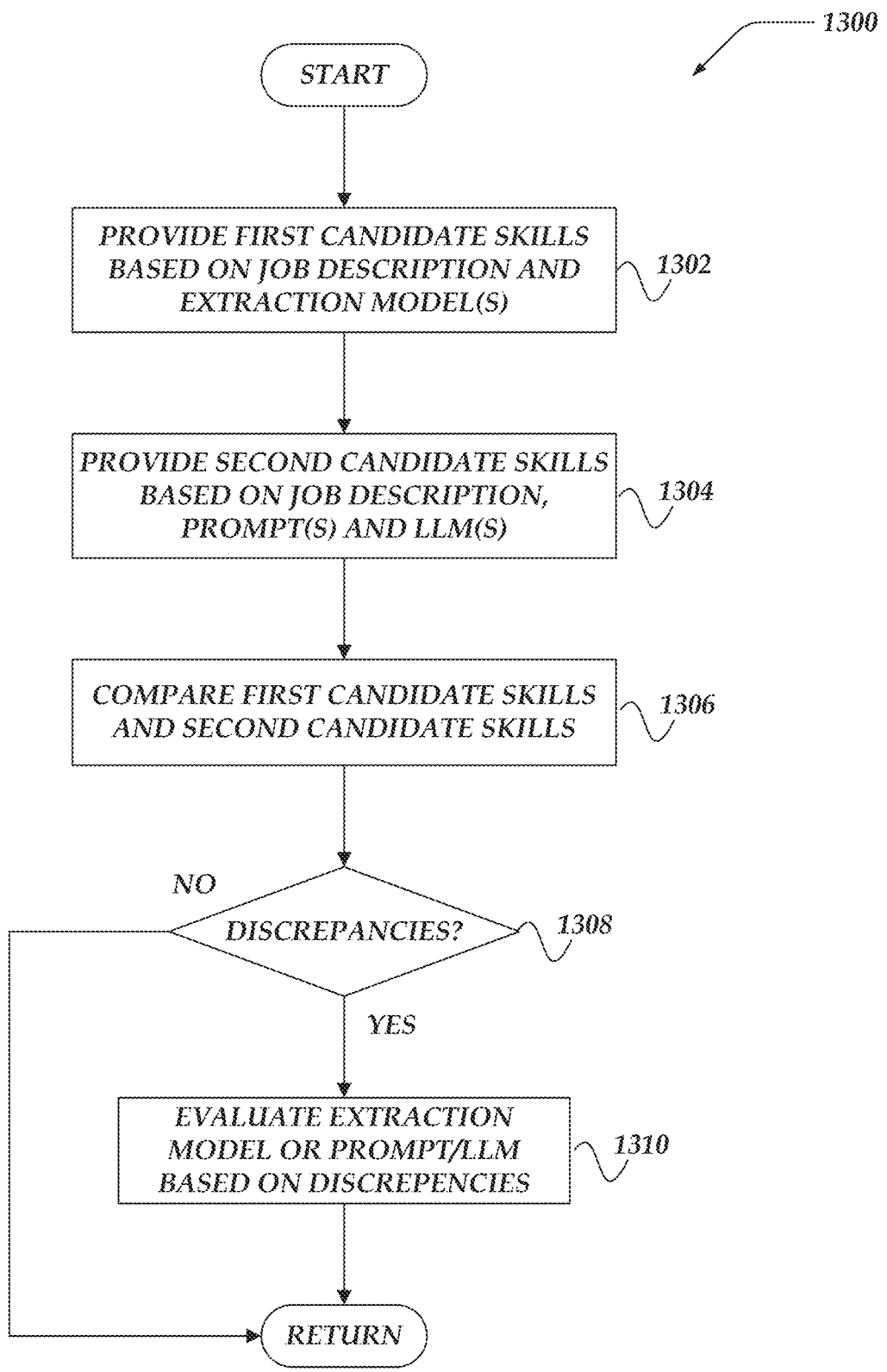
FIG. 13 illustrates a flowchart for a process for analyzing learners in accordance with one or more of the various embodiments.

FIG. 13 illustrates a flowchart for process 1300 for analyzing learners in accordance with one or more of the various embodiments. After a start block, at block 1302, in one or more of the various embodiments, analysis engines may be provided a first set of candidate skills based on job description information and extraction models. As described above, analysis engines may be arranged to determine one or more skills from a job description. In some cases, in some embodiments, learner platforms may be arranged to automatically monitor the quality of skill extraction by comparing the results of different extraction models, prompts, large language models, or the like, to each other.

Accordingly, for example, analysis engines may be arranged to extract a first set of skill from a job description using a first collection for extraction models, prompts, large language models, or the like.

At block 1304, in one or more of the various embodiments, analysis engines may be arranged to provide a second set of candidate skills based on the job description information, the prompts and the large language model(s). Similar to determining the first set of skills described above, analysis engines may be arranged to extract a second set of skills from the same job description using different extraction models, prompts, or large language models.

At block 1306, in one or more of the various embodiments, analysis engines may be arranged to compare the first candidate skills and second candidate skills.

At decision block 1308, in one or more of the various embodiments, if there may be discrepancies between to the first set of candidate skills and the second set of candidate skills, control may flow to block 1310; otherwise, control may be returned to a calling process.

At block 1310, in one or more of the various embodiments, analysis engines may be arranged to evaluate the extraction models or prompts/large language models based on the determined discrepancies. In one or more of the various embodiments, the evaluation based on the different result may vary depending on the circumstances of the instant evaluation.

For example, in some embodiments, the comparison may be applied to confirm if a different or new version of a large language model generates the same or better results than a another or previous version the large language model. For example, if the second collection of skills omits one or more expected skills, the second large language model may be considered unsuitable for use in a system for analyzing learners.

Likewise, in some embodiments, if new extraction models (e.g., used for the generating the second collection of skills), extract more verified declared skills, analysis engines may be arranged to employ the new extraction models.

Further, in some embodiments, if discrepancies may be determined, analysis engines may be arranged to generate one or more reports, notifications, messages, or alerts that bring the discrepancy results to the attention of users.

Next, in one or more of the various embodiments, control may be returned to a calling process.

Figure 14:
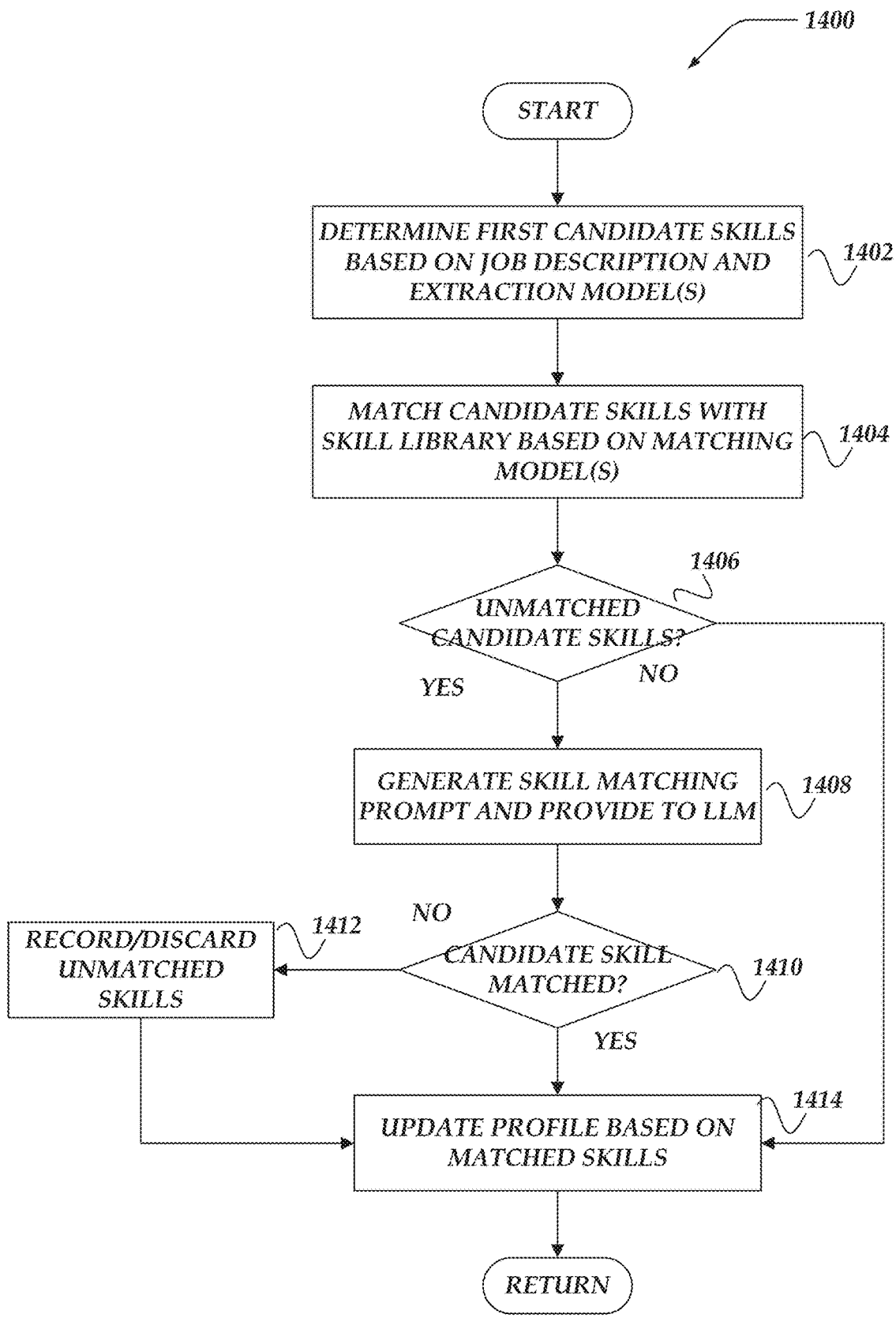
FIG. 14 illustrates a flowchart for a process for analyzing learners in accordance with one or more of the various embodiments.

FIG. 14 illustrates a flowchart for process 1400 for analyzing learners in accordance with one or more of the various embodiments. After a start block, at block 1402, in one or more of the various embodiments, analysis engines may be arranged to determine one or more first candidate skills based on the job description information and the one or more extraction models. As described above, learner platforms may be arranged to determine declare skills or inferred skills from job description information.

At block 1404, in one or more of the various embodiments, analysis engines may be arranged to match candidate skills with skill library based on one or more matching models. In some embodiments, learner platforms may be arranged to include skill libraries that maintain information about known skills. In some embodiments, skill libraries may include skill lists associated with different industries. In some embodiments, skills included in the skill library may be considered to be industry standard (from multiple industries) labels/titles or descriptions for skill the particular industry. Accordingly, in some embodiments, there may be one or more skills that have different labels/titles even though they may generally represent similar activities or expertise.

Accordingly, in some embodiments, if skill may be determined from a job description, learner platforms may be arranged to confirm that those skills may match with entries in the skill library. Thus, in some embodiments, the skill library may be employed as the authoritative source of skills such that extracted skills should be found in the skill library.

At decision block 1406, in one or more of the various embodiments, if there may be one or more unmatched candidate skills, control may flow to block 1408; otherwise, control may flow to block 1414. In one or more of the various embodiments, skills may not match because of spelling errors, local/non-standard skill dialects, or the like. In some cases, if the industry associated with the job description may be a new type of industry or job, some or all skills included in the job description may be associated with labels/titles that may be unmatched in the skill library.

At block 1408, in one or more of the various embodiments, analysis engines may be arranged to generate a skill matching prompt for a large language model.

In one or more of the various embodiments, skill matching prompts may include prompts designed to ask a large language model to predict or infer other labels/titles that may be used for the unmatched skills in other industries.

Accordingly, in some embodiments, a response from the large language model may include a mapping of known skills to the unmatched skills.

At decision block 1410, in one or more of the various embodiments, if the candidate skill may be matched, control may flow to block 1414; otherwise, control may flow to block 1412. In one or more of the various embodiments, skills that may remain unmatched may be either new skills or erroneous skill extractions. Accordingly, in some embodiments, learner platforms may be arranged to generate record of unmatched skills such that reports may be generated by the learner platform to enable users to determine if the unmatched skills should be discarded or included in the skill library.

Next, in one or more of the various embodiments, control may be returned to a calling process.

Figure 15:
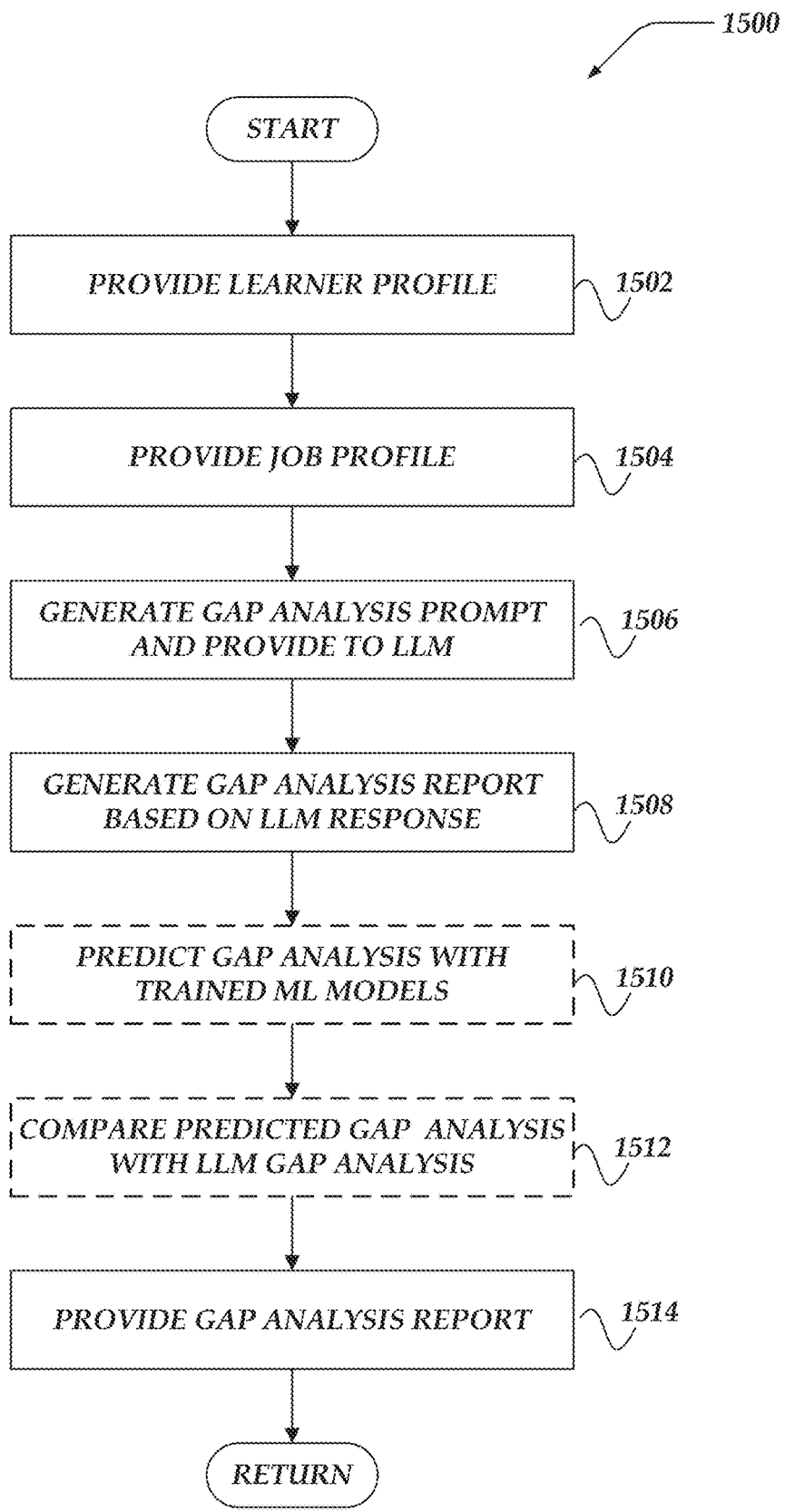
FIG. 15 illustrates a flowchart for a process for analyzing learners in accordance with one or more of the various embodiments.

FIG. 15 illustrates a flowchart for process 1500 for analyzing learners in accordance with one or more of the various embodiments. After a start block, at block 1502, in one or more of the various embodiments, analysis engines may be arranged to determine a learner profile. In one or more of the various embodiments, learner platforms may be arranged to provide user interfaces that enable one or more users to select one or more learner profiles for analysis or review. In some embodiments, learner platforms may be arranged to provide user interfaces that enable a job seeker or student to select their own learner profile for analysis.

At block 1504, in one or more of the various embodiments, analysis engines may be arranged to determine a job profile. In one or more of the various embodiments, learner platforms may be arranged to provide user interfaces that enable one or more users to select one or more job profiles. In some embodiments, learner platforms may be arranged to provide user interfaces that enable a job seeker or student to select one or more job profiles for analysis. In some embodiments, learner platforms may be arranged to provide job profiles based on reports/listings of available jobs or job offers. For example, in some embodiments, a job finding or employee finding application may provide or select job profiles as users may browse through the listed job offerings.

At block 1506, in one or more of the various embodiments, analysis engines may be arranged to generate a gap analysis prompt and provide it to a large language model. In some embodiments, skill gaps may be considered to a representation of the difference in skills reported in a learner profile and a job profile.

In one or more of the various embodiments, a direct comparison of the skill titles in the job profile and the learner profile may be ineffective because in some cases different skill titles may represent similar expertise even though they have different titles. Further, in some cases, the context of the job profile and the learner profile may impact the gap analysis. For example, in some embodiments, in some cases, the importance or impact of one or more skill mismatches may vary depending on the particular job.

In one or more of the various embodiments, gap analysis prompts may be configured to identify missing skills, overlapping skills, irrelevant skills, or the like. Also, in some embodiments, gap analysis prompts may be configured to predict one or more actions to close the skill gaps. In some embodiments, a gap analysis prompt may include a request that the large language model suggest a sequence of actions that a learner can take to close the skill gaps.

Also, in some embodiments, learner platforms may be arranged to generate secondary gap analysis prompts that may be configured to generate a pathway of actions to close the skill gaps. Accordingly, in some embodiments, such prompts may be configured to include the learner profile, the job profile, course/training catalogs, and the skill gap information with a request to determine a sequence of skill acquisitions that may efficiently close the skill gap.

At block 1508, in one or more of the various embodiments, analysis engines may be arranged to generate a gap analysis report based on large language model response.

In some embodiments, gap analysis reports may include information associated with the determined skill gaps. In some embodiments, this information may include a list of missing skills or failed eligibility conditions. In some embodiments, a gap analysis report may include a pathway to actions that may be predicted to close the skill gaps. For example, the pathway information may include one or more sequences of courses/training-programs that are verified to confer the missing skills.

At block 1510, in one or more of the various embodiments, optionally, analysis engines may be arranged to predict gap analysis information with one or more trained machine learning models. In some embodiments, learner platforms may be arranged to one or more machine-learning models that predict skill gaps or skill gap reduction pathways. In some embodiments, conventional machine-learning training may be employed offline to train models to predict or infer skill gaps based on inputs such as a learner profile, job profile, or the like.

At block 1512, in one or more of the various embodiments, optionally, analysis engines may be arranged to compare the predicted gap analysis with the large language model gap analysis. In some embodiments, large language model generated gap analysis information (e.g., skill gaps) may be compared with skill gap information predicted by the trained machine-learning models.

Accordingly, in one or more of the various embodiments, discrepancies in the skill gaps predicted by the machine-learning models and the large language model may signal that either the machine-learning model may be defective or that the large language model (or the prompts) may be defective. Accordingly, in some embodiments, if mismatches may be determined, learner platforms may be arranged to generate a discrepancy report or other provide notification to users of the determined discrepancies.

At block 1514, in one or more of the various embodiments, analysis engines may be arranged to generate the gap analysis report.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of these innovations.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of managing skill proficiencies over a network using one or more processors to execute instructions that are configured to cause actions, comprising:
   determining one or more declared skills based on a job description and one or more natural language processing (NLP) actions declared in one or more extraction models;
   employing a query from a learner to generate query information that includes content and user interface interaction information and prompt template information, wherein one or more prompt templates are selected for generation of an initial prompt based on one or more characteristics of the query information;
   employing the initial prompt and the query information to select a primary large language model (LLM) from a plurality of LLMs;

generating an inference prompt for the primary LLM based on the job description, wherein the job description and the one or more declared skills are included in the inference prompt;

training the primary LLM with the inference prompt to generate an inference response, wherein the inference prompt is iteratively updated based on one or more validations of the inference response;

retraining the primary LLM with the updated inference prompt to generate an updated inference response that includes the one or more inferred skills that are separate from the one or more declared skills;

employing the retrained primary LLM to generate an initial response based on the initial prompt;

training a secondary LLM with a secondary prompt to generate one or more other inferred skills, wherein the secondary prompt includes one or more portions of the initial response;

updating a job profile that corresponds to the job description to include the one or more declared skills, the one or more inferred skills, and the one or more other inferred skills; and employing the query information to generate a context for an importance of one or more skill mismatches between the learner and the updated job profile, wherein one or more predictions to reduce the skill mismatch are generated and provided to the learner.

2. The method of claim 1, further comprises:
wherein the job description is based on a job history of the learner; and
updating a learner profile that corresponds to the learner to include the one or more declared skills and the one or more separate inferred skills.

3. The method of claim 1, further comprising:
determining one or more secondary LLMs based on the initial response and query information;
generating one or more secondary prompts for the one or more secondary LLMs, wherein the one or more secondary prompts include the one or more portions of the initial response;
training the one or more secondary LLMs with the one or more secondary prompts to generate one or more secondary responses that include the one or more other inferred skills; and
including the one or more other inferred skills in the job profile.

4. The method of claim 1, further comprising:
determining one or more first candidate skills based on the one or more extraction models and the job description;
generating an extraction prompt for the primary LLM based on the job description, wherein the job description is included in the extraction prompt;
training the primary LLM with the extraction prompt to generate an extraction response that includes one or more second candidate skills;
determining one or more skill mismatches based on a comparison of the one or more first candidate skills to the one or more second candidate skills; and
in response to a number of skill mismatches exceeding a threshold value, modifying the one or more extraction models based on the one or more skill mismatches.

5. The method of claim 1, further comprising:
determining a learner profile that corresponds to a job seeker based on identity of the job seeker;
generating a gap analysis prompt for the primary LLM based on the learner profile and the job profile; and training the primary LLM with the gap analysis prompt to generate a gap analysis response that declares one or more actions that enable the job seeker to qualify for a job that corresponds to the job profile, wherein the one or more actions include a successful completion of one or more of a training program or an educational program.

6. The method of claim 1, wherein updating the inference prompt, further comprises:
determining one or more validators based on the response from the primary LLM, wherein the one or more validators declare a data format and one or more expected values or value types; and
validating the response based on the one or more validators, wherein the one or more validators confirm that information included in the response conforms to the data format and includes the one or more expected values.

7. A network computer for managing skill proficiencies over a network, comprising:
a memory that stores at least instructions; and
one or more processors that execute the instructions that are configured to cause actions, including:
determining one or more declared skills based on a job description and one or more natural language processing (NLP) actions declared in one or more extraction models;
employing a query from a user to generate query information that includes content and user interaction information and prompt template information, wherein one or more prompt templates are selected for generation of an initial prompt based on one or more characteristics of the query information;
employing the initial prompt and the query information to select a primary large language model (LLM) from a plurality of LLMs;
generating an inference prompt for the primary LLM based on the job description, wherein the job description and the one or more declared skills are included in the inference prompt;
training the primary LLM with the inference prompt to generate an inference response, wherein the inference prompt is iteratively updated based on one or more validations of the inference response;
retraining the primary LLM with the updated inference prompt to generate an updated inference response that includes the one or more inferred skills that are separate from the one or more declared skills;
employing the retrained primary LLM to generate an initial response based on the initial prompt;
training a secondary LLM with a secondary prompt to generate one or more other inferred skills, wherein the secondary prompt includes one or more portions of the initial response;
updating a job profile that corresponds to the job description to include the one or more declared skills, the one or more inferred skills, and the one or more other inferred skills and
employing the query information to generate a context for an importance of one or more skill mismatches between the learner and the updated job profile, wherein one or more predictions to reduce the skill mismatch are generated and provided to the learner.

8. The network computer of claim 7, wherein the one or more processors execute instructions that are configured to cause actions that perform actions, further comprising:

wherein the job description is based on a job history of the learner; and updating a learner profile that corresponds to the learner to include the one or more declared skills and the one or more separate inferred skills.

9. The network computer of claim 7, wherein the one or more processors execute instructions that are configured to cause actions that perform actions, further comprising:

determining one or more secondary LLMs based on the initial response and query information;

generating one or more secondary prompts for the one or more secondary LLMs, wherein the one or more secondary prompts include the one or more portions of the initial response;

training the one or more secondary LLMs with the one or more secondary prompts to generate one or more secondary responses that include the one or more other inferred skills; and including the one or more other inferred skills in the job profile.

10. The network computer of claim 7, wherein the one or more processors execute instructions that are configured to cause actions that perform actions, further comprising:

determining one or more first candidate skills based on the one or more extraction models and the job description;

generating an extraction prompt for the primary LLM based on the job description, wherein the job description is included in the extraction prompt;

training the primary LLM with the extraction prompt to generate an extraction response that includes one or more second candidate skills;

determining one or more skill mismatches based on a comparison of the one or more first candidate skills to the one or more second candidate skills; and in response to a number of skill mismatches exceeding a threshold value, modifying the one or more extraction models based on the one or more skill mismatches.

11. The network computer of claim 7, wherein the one or more processors execute instructions that are configured to cause actions that perform actions, further comprising:

determining a learner profile that corresponds to a job seeker based on identity of the job seeker;

generating a gap analysis prompt for the primary LLM based on the learner profile and the job profile; and training the primary LLM with the gap analysis prompt to generate a gap analysis response that declares one or more actions that enable the job seeker to qualify for a job that corresponds to the job profile, wherein the one or more actions include a successful completion of one or more of a training program or an educational program.

12. The network computer of claim 7, wherein updating the inference prompt, further comprises:

determining one or more validators based on the response from the primary LLM, wherein the one or more validators declare a data format and one or more expected values or value types; and validating the response based on the one or more validators, wherein the one or more validators confirm that information included in the response conforms to the data format and includes the one or more expected values.

13. A processor readable non-transitory storage media that includes instructions for managing skill proficiencies over a network, wherein execution of the instructions by one or more processors performs actions, comprising:

determining one or more declared skills based on a job description and one or more natural language processing (NLP) actions declared in one or more extraction models;

employing a query from a user to generate query information that includes content and user interaction information and prompt template information, wherein one or more prompt templates are selected for generation of an initial prompt based on one or more characteristics of the query information;

employing the initial prompt and the query information to select a primary large language model (LLM) from a plurality of LLMs;

generating an inference prompt for the primary LLM based on the job description, wherein the job description and the one or more declared skills are included in the inference prompt;

training the primary LLM with the inference prompt to generate an inference response, wherein the inference prompt is iteratively updated based on one or more validations of the inference response;

retraining the primary LLM with the updated inference prompt to generate an updated inference response that includes the one or more inferred skills that are separate from the one or more declared skills;

employing the retrained primary LLM to generate an initial response based on the initial prompt;

training a secondary LLM with a secondary prompt to generate one or more other inferred skills, wherein the secondary prompt includes one or more portions of the initial response;

updating a job profile that corresponds to the job description to include the one or more declared skills, the one or more inferred skills, and the one or more other inferred skills and employing the query information to generate a context for an importance of one or more skill mismatches between the learner and the updated job profile, wherein one or more predictions to reduce the skill mismatch are generated and provided to the learner.

14. The media of claim 13, further comprises:

wherein the job description is based on a job history of the learner; and updating a learner profile that corresponds to the learner to include the one or more declared skills and the one or more separate inferred skills.

15. The media of claim 13, further comprising:

determining one or more secondary LLMs based on the initial response and query information;

generating one or more secondary prompts for the one or more secondary LLMs, wherein the one or more secondary prompts include the one or more portions of the initial response;

training the one or more secondary LLMs with the one or more secondary prompts to generate one or more secondary responses that include the one or more other inferred skills; and including the one or more other inferred skills in the job profile.

16. The media of claim 13, further comprising:

determining one or more first candidate skills based on the one or more extraction models and the job description;

generating an extraction prompt for the primary LLM based on the job description, wherein the job description is included in the extraction prompt;

training the primary LLM with the extraction prompt to generate an extraction response that includes one or more second candidate skills;
determining one or more skill mismatches based on a comparison of the one or more first candidate skills to the one or more second candidate skills; and
in response to a number of skill mismatches exceeding a threshold value, modifying the one or more extraction models based on the one or more skill mismatches.

17. The media of claim 13, further comprising:
determining a learner profile that corresponds to a job seeker based on identity of the job seeker;
generating a gap analysis prompt for the primary LLM based on the learner profile and the job profile; and
training the primary LLM with the gap analysis prompt to generate a gap analysis response that declares one or more actions that enable the job seeker to qualify for a job that corresponds to the job profile, wherein the one or more actions include a successful completion of one or more of a training program or an educational program.

18. The media of claim 13, wherein updating the inference prompt, further comprises:
determining one or more validators based on the response from the primary LLM, wherein the one or more validators declare a data format and one or more expected values or value types; and
validating the response based on the one or more validators, wherein the one or more validators confirm that information included in the response conforms to the data format and includes the one or more expected values.

19. A system for managing skill proficiencies, comprising:
a network computer, comprising:
a memory that stores at least instructions; and
one or more processors that execute the instructions that are configured to cause actions, including:
determining one or more declared skills based on a job description and one or more natural language processing (NLP) actions declared in one or more extraction models;
employing a query from a user to generate query information that includes content and user interaction information and prompt template information, wherein one or more prompt templates are selected for generation of an initial prompt based on one or more characteristics of the query information;
employing the initial prompt and the query information to select a primary large language model (LLM) from a plurality of LLMs;
generating an inference prompt for the primary LLM based on the job description, wherein the job description and the one or more declared skills are included in the inference prompt;
training the primary LLM with the inference prompt to generate an inference response, wherein the inference prompt is iteratively updated based on one or more validations of the inference response;
retraining the primary LLM with the updated inference prompt to generate an updated inference response that includes the one or more inferred skills that are separate from the one or more declared skills;
employing the retrained primary LLM to generate an initial response based on the initial prompt;
training a secondary LLM with a secondary prompt to generate one or more other inferred skills, wherein the secondary prompt includes one or more portions of the initial response;
updating a job profile that corresponds to the job description to include the one or more declared skills, the one or more inferred skills, and the one or more other inferred skills and
employing the query information to generate a context for an importance of one or more skill mismatches between the learner and the updated job profile, wherein one or more predictions to reduce the skill mismatch are generated and provided to the learner; and
a client computer, comprising:
a memory that stores at least instructions; and
one or more processors execute the instructions that are configured to cause actions, including:
providing the job description.

20. The system of claim 19, wherein the one or more network computer processors execute instructions that are configured to cause actions that perform actions, further comprising:
wherein the job description is based on a job history of the learner; and
updating a learner profile that corresponds to the learner to include the one or more declared skills and the one or more separate inferred skills.

21. The system of claim 19, wherein the one or more network computer processors execute instructions that are configured to cause actions that perform actions, further comprising:
determining one or more secondary LLMs based on the initial response and query information;
generating one or more secondary prompts for the one or more secondary LLMs, wherein the one or more secondary prompts include the one or more portions of the initial response;
training the one or more secondary LLMs with the one or more secondary prompts to generate one or more secondary responses that include the one or more other inferred skills; and
including the one or more other inferred skills in the job profile.

22. The system of claim 19, wherein the one or more network computer processors execute instructions that are configured to cause actions that perform actions, further comprising:
determining one or more first candidate skills based on the one or more extraction models and the job description;
generating an extraction prompt for the primary LLM based on the job description, wherein the job description is included in the extraction prompt;
training the primary LLM with the extraction prompt to generate an extraction response that includes one or more second candidate skills;
determining one or more skill mismatches based on a comparison of the one or more first candidate skills to the one or more second candidate skills; and
in response to a number of skill mismatches exceeding a threshold value, modifying the one or more extraction models based on the one or more skill mismatches.

23. The system of claim 19, wherein the one or more network computer processors execute instructions that are configured to cause actions that perform actions, further comprising:

determining a learner profile that corresponds to a job seeker based on identity of the job seeker;

generating a gap analysis prompt for the primary LLM based on the learner profile and the job profile; and training the primary LLM with the gap analysis prompt to generate a gap analysis response that declares one or more actions that enable the job seeker to qualify for a job that corresponds to the job profile, wherein the one or more actions include a successful completion of one or more of a training program or an educational program.

24. The system of claim 19, wherein updating the inference prompt, further comprises:

determining one or more validators based on the response from the primary LLM, wherein the one or more validators declare a data format and one or more expected values or value types; and validating the response based on the one or more validators, wherein the one or more validators confirm that information included in the response conforms to the data format and includes the one or more expected values.

* * * * *

UNITED STATES PATENT AND TRADEMARK OFFICE
CERTIFICATE OF CORRECTION

| | | |
|---|---|---|
| PATENT NO. | : 12,099,975 B1 | Page 1 of 1 |
| APPLICATION NO. | : 18/486498 | |
| DATED | : September 24, 2024 | |
| INVENTOR(S) | : Cai et al. | |

It is certified that error appears in the above-identified patent and that said Letters Patent is hereby corrected as shown below:

In the Claims

In Column 34, Line 59, in Claim 7, delete "skills and" and insert -- skills; and --, therefor.

In Column 36, Line 37, in Claim 13, delete "skills and" and insert -- skills; and --, therefor.

In Column 38, Line 8, in Claim 19, delete "skills and" and insert -- skills; and --, therefor.

Signed and Sealed this
Twenty-second Day of April, 2025

Coke Morgan Stewart
*Acting Director of the United States Patent and Trademark Office*